(12) United States Patent
Maekawa et al.

(10) Patent No.: US 7,733,504 B2
(45) Date of Patent: Jun. 8, 2010

(54) SHAPE EVALUATION METHOD, SHAPE EVALUATION DEVICE, AND DEVICE HAVING THE SHAPE EVALUATION DEVICE

(75) Inventors: Takashi Maekawa, Kanagawa (JP); Yoh Nishimura, Kanagawa (JP); Takayuki Sasaki, Kanagawa (JP); Yuu Nishiyama, Kanagawa (JP)

(73) Assignee: National University Corporation Yokohama National University, Yokohama-Shi (JP)

( * ) Notice: Subject to any disclaimer, the term of this patent is extended or adjusted under 35 U.S.C. 154(b) by 336 days.

(21) Appl. No.: 11/794,718

(22) PCT Filed: Dec. 6, 2005

(86) PCT No.: PCT/JP2005/022356

§ 371 (c)(1),
(2), (4) Date: Jul. 6, 2007

(87) PCT Pub. No.: WO2006/073036

PCT Pub. Date: Jul. 13, 2006

(65) Prior Publication Data

US 2008/0088855 A1    Apr. 17, 2008

(30) Foreign Application Priority Data

Jan. 7, 2005  (JP)  ............................. 2005-003242
Sep. 1, 2005  (JP)  ............................. 2005-254169

(51) Int. Cl.
*G01B 11/24*  (2006.01)

(52) U.S. Cl. ...................................... 356/612; 356/601
(58) Field of Classification Search ......... 356/601–613, 356/237.1–237.5
See application file for complete search history.

(56) References Cited

OTHER PUBLICATIONS

Lin Hongwei et al., "Constructing Iterative Non-Uniform B-spline Curve and Surface to Fit Data Points", Science in China (Information Sciences), 2004.

(Continued)

*Primary Examiner*—Michael P Stafira
(74) *Attorney, Agent, or Firm*—Westerman, Hattori, Daniels & Adrian, LLP

(57) ABSTRACT

A shape evaluation device performs simulation by using an annular light source or concentric light source instead of a rectilinear light source and calculates a characteristic line for performing shape evaluation. The shape evaluation device includes a calculation device (2) having: a distance vector calculation unit (2a) for acquiring a distance vector representing a distance between the circle and the vector, a distance function unit (2b) for acquiring a distance function from the distance vector, and a distance function calculation unit (2c) for acquiring a point on a curved surface where the value of the distance function is a predetermined value. By performing simulation using the annular or concentric light source, it is possible to obtain a characteristic line capable of observing distortion in all the directions by one calculation. The present invention reduces the number of calculations required for calculating the characteristic line for performing shape evaluation and reduce the time required for calculation, thereby enabling evaluation by a dynamic shape.

25 Claims, 29 Drawing Sheets

OTHER PUBLICATIONS

Loos et al., "Modeling of Surfaces with Fair Reflection Line Pattern", IEEE, 1999.
Loos et al., "Modeling of Surfaces with Fair Reflection Line Pattern", IEEE, 1999.
Thomas Poeschl; "Detecting surface irregularities using isophotes", Computer Aided Geometric Design 1, 1984, pp. 163-168.
I. Choi et al.; "Efficient generation of reflection lines to evaluate car body surfaces", Math. Engng. Ind., vol. 7, No. 2, 1998, pp. 233-250.
Gershon Elber; "Curve Evaluation and Interrogation on Survaces", Jun. 22, 2005.
Klaus-Peter Beier et al.; "Highlight-line algorithm for realtime surface-quality assessment", Computer-Aided Design, vol. 26, No. 4, Apr. 4, 1994.
Yifan Chen et al.; "Direct Highlight line modification on nurbs surfaces", Computer Aided Geometric Design 14, 1997, pp. 583-601.
Junji Sone et al.; "Surface highlight control using Quartic Blending NURBS Boundary Gregory Patch", vol. 37, No. 12, Dec. 1996.
Caiming Zhang et al.; "Removing local irregularities of NURBS surfaces by modifying highlight lines"; Comuter Aided Design, vol. 30, No. 12, 1998, pp. 923-930.
Jun-Hai Yong et al.; "Dynamic highlight line generation for locally deforming NURBS surfaces"; Computer-Aided Design 35, 2003, pp. 881-892.
J. E. Hacke, Jr.; "A Simple Solution of the General Quartic", The American Mathematical Monthly, vol. 48, No. 5, May 1941, pp. 327-328.
International Search Report of PCT/JP2005/022356, date of mailing Feb. 14, 2006.

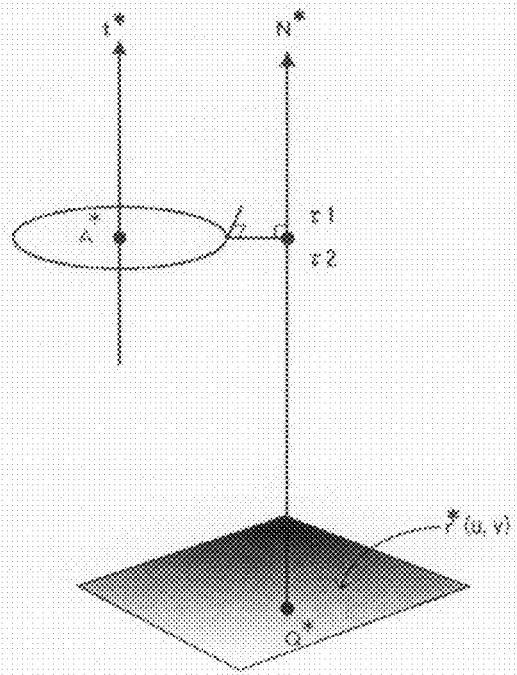
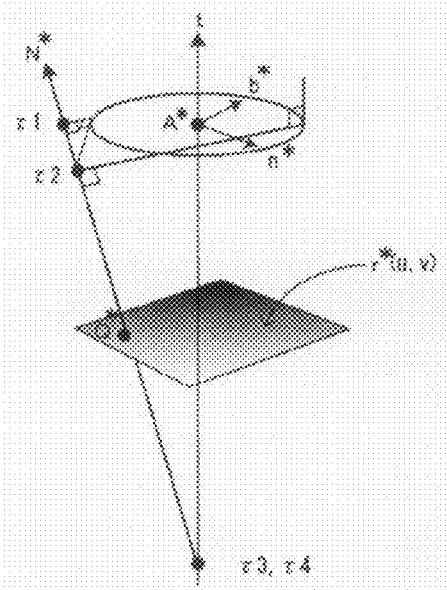
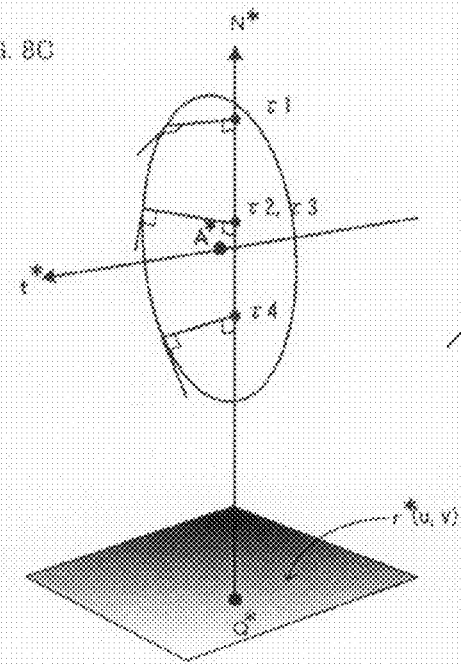
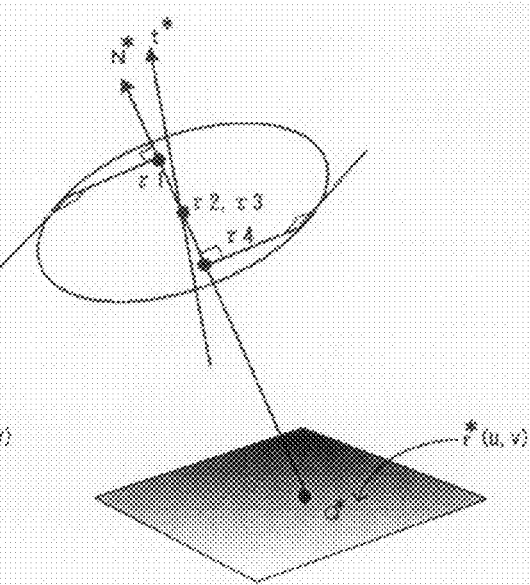

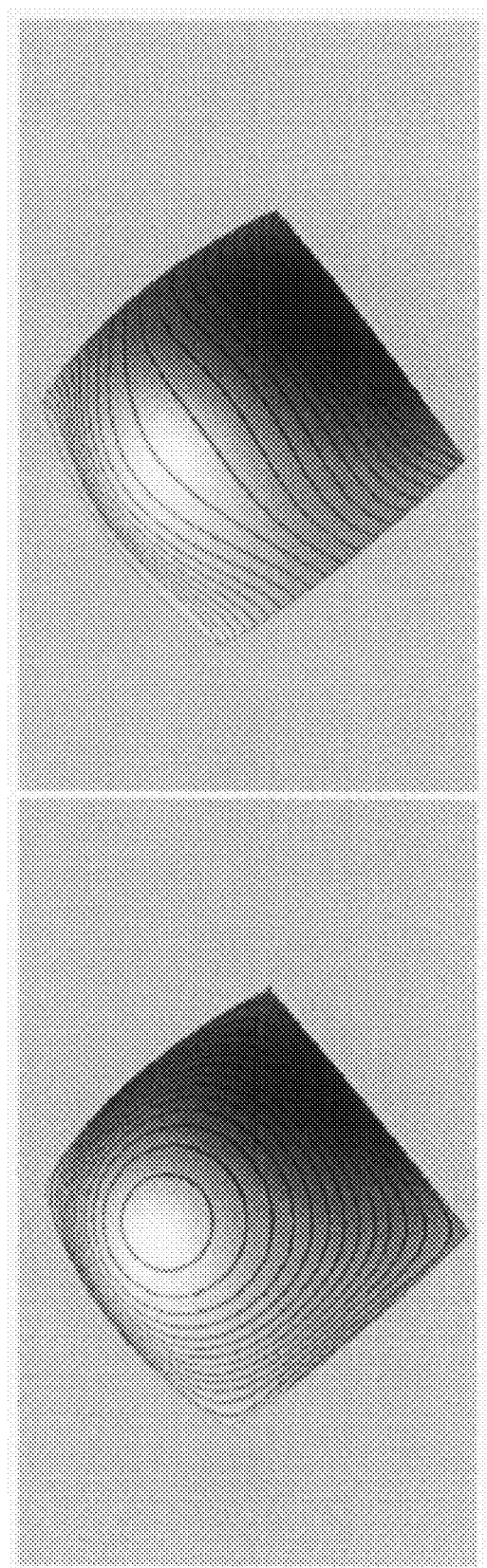

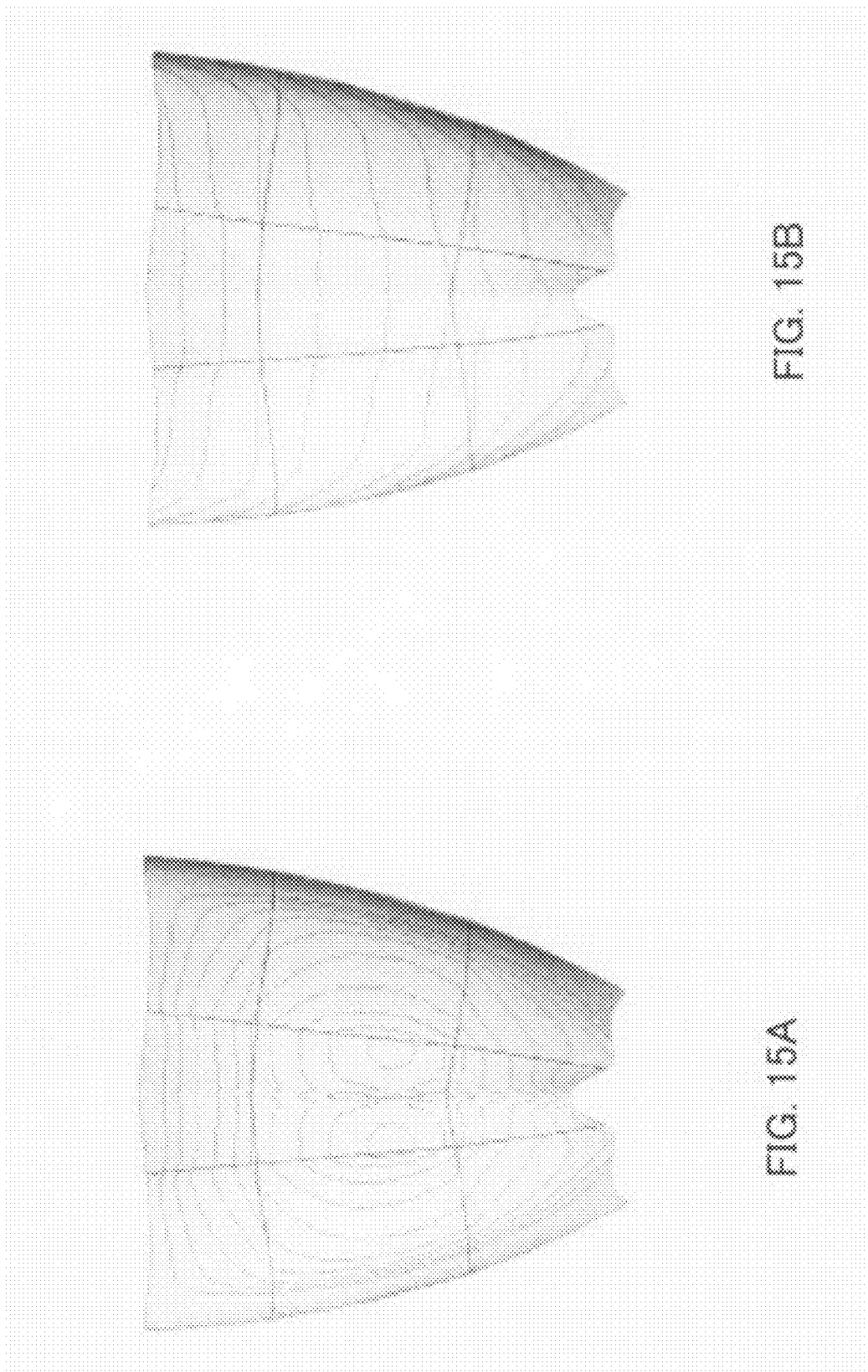

$L(t, \theta) = A + R(t, (\cos\theta n + \sin\theta b))$

CIRCULAR HIGHLIGHT LINE $L(t, \theta) = A + R(t, (\cos\theta n + \sin\theta b))$

VIEW POINT E

CIRCULAR REFLECTION LINE

FIG. 18A
t = t1
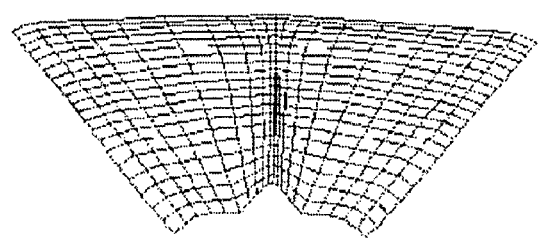
FIG. 18B
t = t2
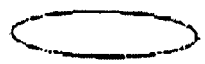
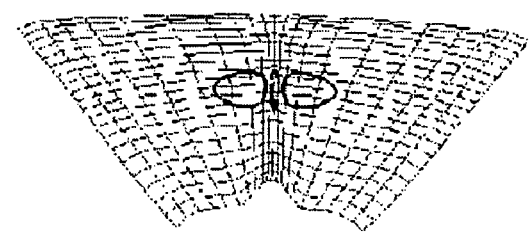
FIG. 18C
t = t3
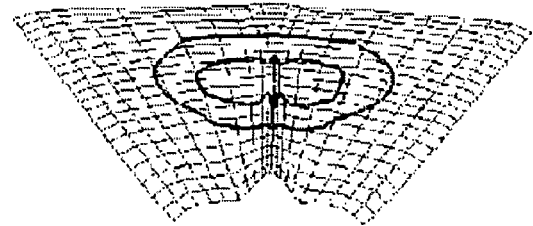

t = t4 t = t5 t = t6

FIG. 21A  t=t1

FIG. 21B  t=t2
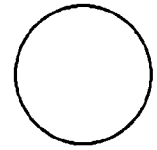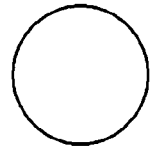
FIG. 21C  t=t3
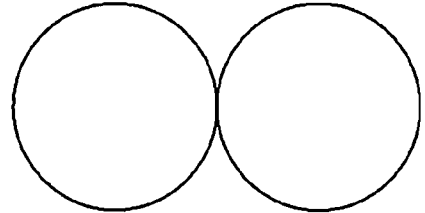
FIG. 21D  t=t4
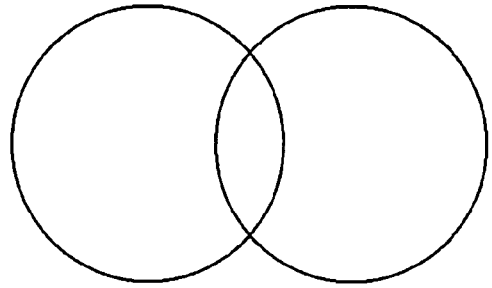
FIG. 21E  t=t5
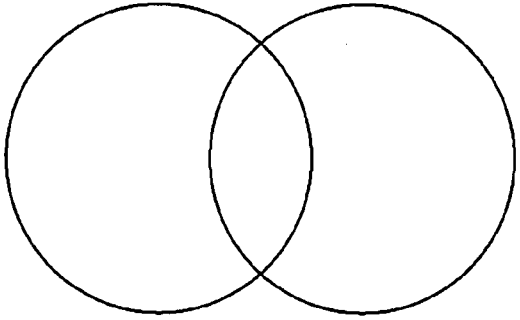
FIG. 21F  t=t1

FIG. 21G  t=t2
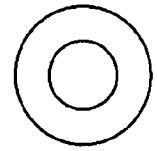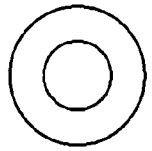
FIG. 21H  t=t3
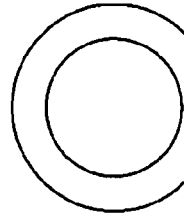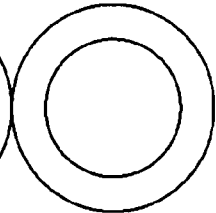
FIG. 21I  t=t4
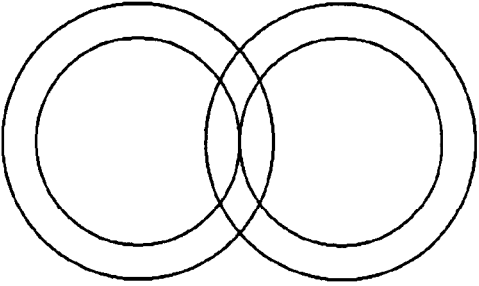
FIG. 21J  t=t5
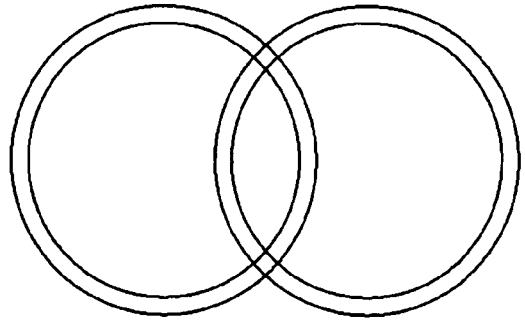

t=t1 t=t2 t=t3 t=t4

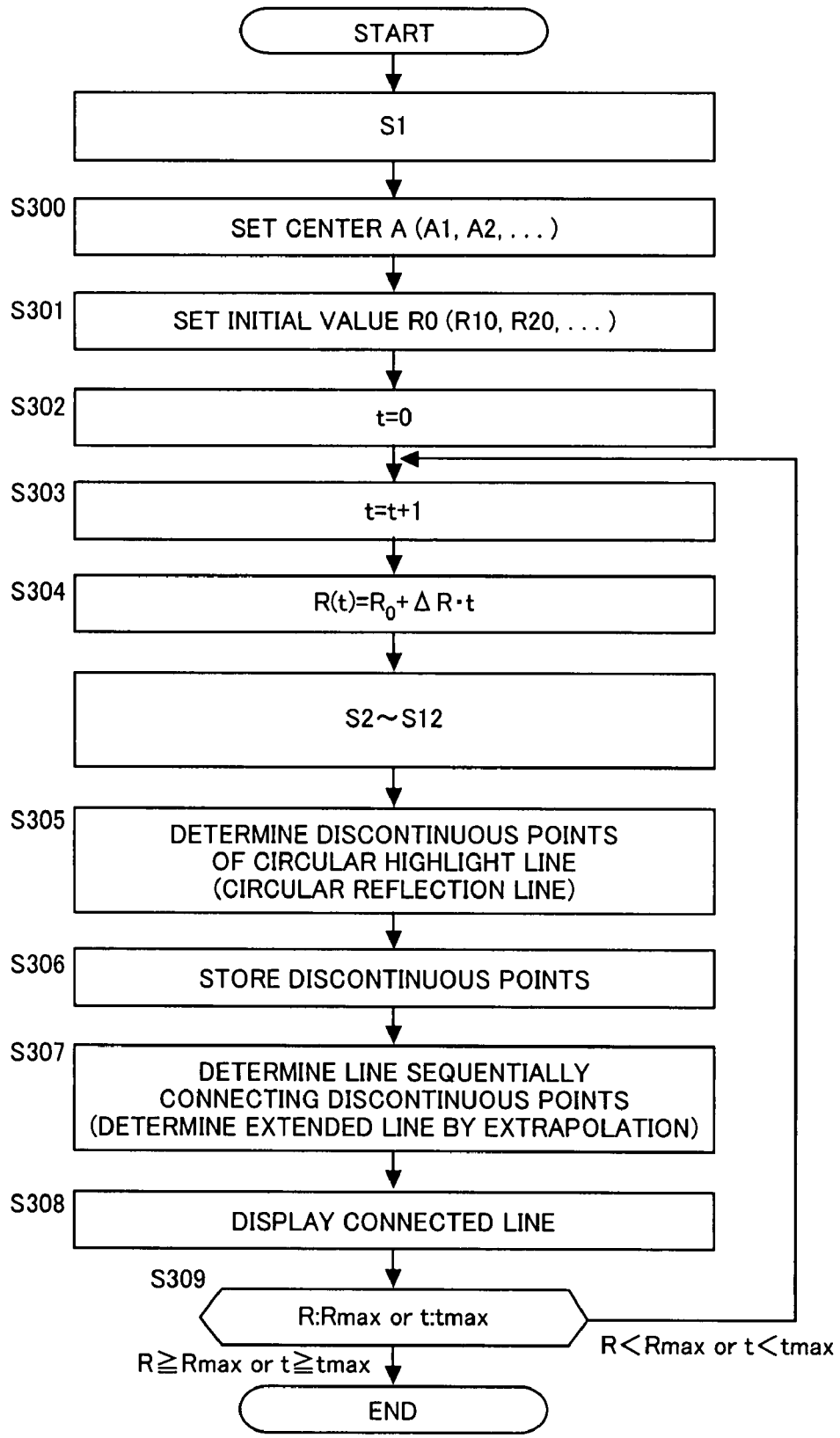

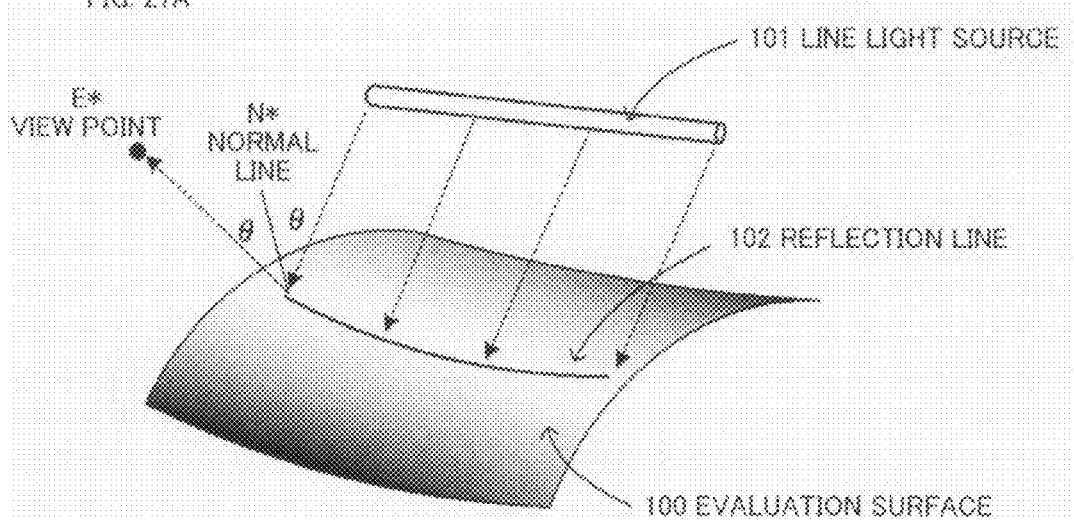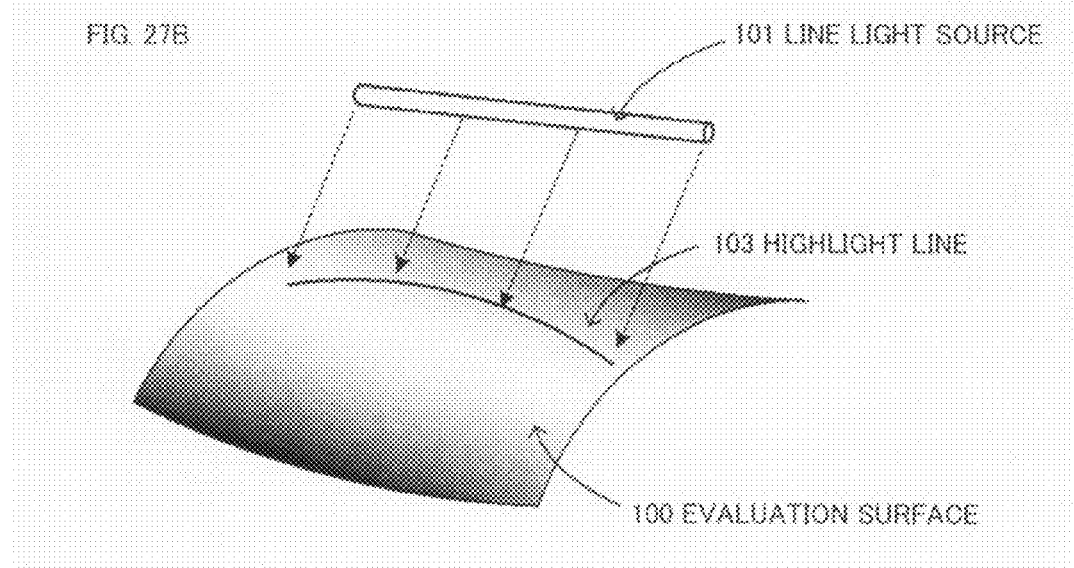

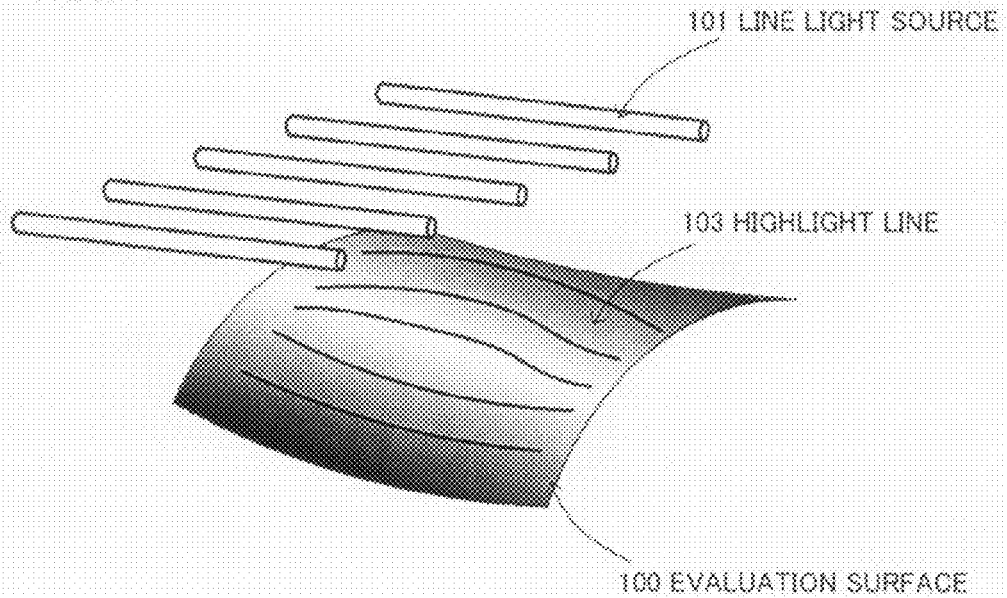
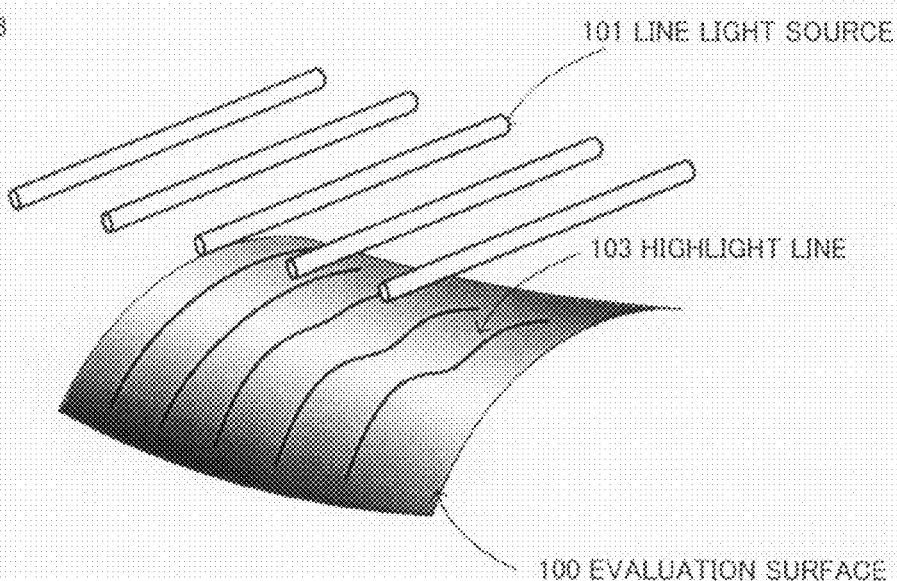

US 7,733,504 B2

SHAPE EVALUATION METHOD, SHAPE EVALUATION DEVICE, AND DEVICE HAVING THE SHAPE EVALUATION DEVICE

TECHNICAL FIELD

The present invention relates to the curved surface quality evaluation of a shape, and more particularly to a shape evaluation method and a shape evaluation device for evaluating shape by simulating on a computer a line of a light which is projected by irradiating light on the curved face of the shape, and a device having the shape evaluation device.

BACKGROUND ART

A free-form surface is used for the bodies of various industrial products, such as ships, automobiles and airplanes, having both functionality and beauty, and is used for designing beautiful artistic shapes, such as home electric products and the appearance of many consumer goods. These curved surfaces are called a "Class A surface". In order to estimate the beauty of a Class A surface, various evaluation methods have been proposed and used.

As the use of three-dimensional CAD and CAM systems spread, the curved surface quality evaluations of curved surface of design shapes are more extensively used in industrial design and manufacturing fields. In the case of the design of the outside plate body of an automobile, for example, a designer irradiates parallel lights from a fluorescent lamp on a clay model, visually observes the reflected light projected on the surface of the clay model, observes the appearance of the shape of the reflection light which the reflection light forms on the formed surface, and detects the repair sections by the distortion of reflection lines.

Shape evaluation by simulation on a computer has been proposed instead of quality evaluation by irradiating parallel lights from a fluorescent lamp on an actual model has been proposed. As a method for forming light lines on an evaluation target surface on a computer, evaluation methods using Isophotes, Reflection lines or Highlight lines are known. These evaluation methods are inspection method using a single differentiation of the evaluation surface. These reflection lines and highlight lines for shape evaluation are collectively called "characteristic lines".

For shape evaluation by Isophotes, a curve with a predetermined illuminance on the curved surface created by a point light source at an infinite point in a direction specified by the user is used. These curves are used for detecting the distortion of the curved surface. If the curved surface has $C^M$ continuity, then Isophotes lines are $C^{M-1}$ continuous (Non-patent Documents 1 and 2).

Shape evaluation by reflection lines is based on simulation of a mirror image of lights irradiated from a light source of a parallel line group viewed from a fixed point on a smooth curved surface, and a deviation from the smooth shape of the curved surface is detected by the distortion of the reflection lines. The deviation of the curved surface can be corrected by correcting the distortion of the reflection lines.

Generating reflection lines on a trimmed NURBS surface using the mapping function of Blinn-Newell type reflection, which is simple and can be physically acquired, has also been proposed (Non-patent Document 3). Also in Non-patent Document 4, calculating the reflection lines of a small chained annular light source group along a straight line has been proposed.

FIG. 27A is a diagram depicting a shape evaluation by a reflection line. In FIG. 27A, parallel linear lights are irradiated from a line light source 101 on an evaluation surface 100, and lights reflected on the evaluation surface 100 are observed at a view point E. The view point E and the line light source 101 are at symmetric angle positions (angle θ) with respect to a normal line N on the evaluation surface 100, and the line light source 101 is observed at view point E as a reflection line 102. In the case of the shape evaluation based on a reflection line, the reflection line 102, projected on the evaluation surface 100 with respect to the line light source 101 and the view point E, is determined by performing computer simulation.

Shape evaluation using an oval curve instead of a linear reflection line has also been proposed (Non-patent Document 5). FIG. 28 are diagrams depicting the shape evaluation based on the oval curve. According to this non-patent document, when a point Ps is set in a space in FIG. 28A, a point, where an angle formed by the vector r* and vector from the point S to the point Ps becomes α, is determined out of the points S on the evaluation surface on which the incident light V* reflects in the r* direction when the points Ps are set in space. The set of the points S on the evaluation surface at which the angle α formed by these two vectors is similar to an isocline with angle α, which is determined as a reflection line (FIG. 28B). Here the symbol "*" indicates a vector.

Shape evaluation based on a highlight line, on the other hand, is a shape evaluation based on a reflection line which is simplified. Since the highlight line does not depend on a view point, the calculation of a view point is unnecessary, unlike the case of shape evaluation based on a reflection line (Non-patent Document 6).

FIG. 29A and FIG. 29B are diagrams depicting shape evaluation based on highlight lines. In FIG. 29B, a curve on the evaluation surface 100, of which distance between the extension of the normal line N on the evaluation surface 100 and the line light source 101 is within a predetermined range, is observed as a highlight line 103.

Since the simulation of the highlight line does not require a view point, the computing time is decreased.

In shape evaluation based on a highlight line, a method for automatically updating control points on an NURBS surface and for determining a required shape by specifying a shape of highlight lines projected on the NURBS surface has been proposed (Non-patent Document 7), and a method for directly controlling highlight lines using an NURBS boundary Gregory patch has been proposed (Non-patent document 8).

Also a method for removing local irregularities of the NURBS surface by modifying the highlight lines in real-time interactive design has been proposed (Non-patent Document 9).

Also a method for generating dynamic highlight lines on a locally deformed NURBS surface using a Talor development method instead of a follow up method, of which processing time is long, has been proposed (Non-patent Document 10).

Non-patent Document 1. N. M. Patrikalakis and T. Maekawa: Shape Interrogation for Computer Aided Design and Manufacturing, Heidelberg, Germany: Springer-Verlag, 2002

Non-patent Document 2. T. Poeschl: Detecting surface irregularities using isophotoes, Computer Aided Geometric Design, 1(2), 163-168, 1984

Non-patent Document 3. I. Choi and K. Lee: Efficient generation of reflection lines to evaluate car body surfaces, Mathematical Engineering in Industry, 7(2), 233-250, 1998

Non-patent Document 4. T. Kanai: Surface interrogation by reflection lines of a moving body, Bachelor's Thesis, The University of Tokyo, Department of Precision Machinery Engineering, Tokyo, Japan, 1992, in Japanese at—http://web.sfc.keio.ac.jp/kanai/rline/bth.pdf Non-patent Document 5. Gershon Elber: Curve Evaluation and Interrogation on Surfaces, Graphical Models, Vol. 63, 197-210, 2001

Non-patent Document 6. K. P. Beier and Y. Chen: Highlight-line algorithm for real time surface quality assessment, Computer-Aided Design, 26(4), 268-277, 1994

Non-patent Document 7. Y. Chen, K. P. Beier and D. Papageorgiou: Direct highlight-line modification on NURBS surfaces, Computer-Aided Geometric Design, 14(6), 583-601, 1997

Non-patent Document 8. J. Sone and H. Chiyokura: Surface highlight control using quadratic blending NURBS boundary Gregory patch, Journal of Information Processing Society of Japan, 37(12), 2212-2222, 1996, in Japanese Non-patent Document 9. C. Zhang and F. Cheng: Removing local irregularities of NURBS surfaces by modifying highlight lines, Computer-Aided Design, 30(12), 923-930, 1998

Non-patent Document 10. J. H. Yong, F. Cheng, Y. Chen, P. Stewart and K. T. Miura: Dynamic highlight line generation for locally deforming NURBS surfaces: Computer-Aided Design, 35(10), 881-892, 2003

Non-patent Document 11. J. E. Hacke: A simple solution of the general quartic: American Mathematical Monthly, 48(5), 327-328, 1941

DISCLOSURE OF THE INVENTION

In the case of a shape evaluation by a reflection line and a shape evaluation by a highlight line proposed in prior art, which generally uses a rectilinear light source as a light source, a characteristic line, such as a reflection line and highlight line, to be generated, presents a one-directional shape characteristic on an evaluation surface. In order to observe distortions in all directions on the curved surface of the evaluation surface, evaluation cannot be sufficiently performed only with a one-directional characteristic line, so at least two directions of characteristic lines are required by changing the direction of the light source.

FIG. 29 are diagrams depicting a conventional shape evaluation based on a characteristic line. FIG. 29A and FIG. 29B show two directions of characteristic lines acquired when the rectilinear light surface is set in directions respectively. By changing the directions of the rectilinear light sources, a shape characteristic, that cannot be observed by a characteristic line in one direction, can be observed in two directions by acquiring a characteristic line in another direction.

This means that according to a conventional shape evaluation, at least two computations are required to observe the distortion in all directions on a curved surface, which makes computing time long, or which requires a faster computing unit.

Also calculation to determine an optimum value must be repeated while changing parameters, so one computation takes a long time.

In the above mentioned Non-patent Document 5, performing shape evaluation using an oval curve is proposed. However in this shape evaluation, the reflection line on the evaluation surface is determined based on a reflection line with which the angle formed with a line from a fixed point becomes a predetermined value, so the shape of the light source side is not always an annular shape. Also as a condition of computing when the reflection line is determined, an angle with the line from the fixed point is defined, but the physical relationship of this condition and the reflection line is unknown. As described above, it is not guaranteed that the shape at the light source side will become an annular shape, and the basis of the conditions to determine the reflection line is unknown, so it is not guaranteed that the determined reflection line will accurately represent the surface shape of the evaluation target. Another problem is that the highlight line cannot be determined.

In the proposed shape evaluation based on a reflection line and shape evaluation based on a highlight line, a light emitted from the light source is in a stationary status. Therefore a reflection line or a highlight line, which the light emitted from the light source projects on the evaluation surface, is observed as a stationary shape. The evaluation operator must estimate a shape status on the evaluation face based on this stationary shape to perform an evaluation. This means that the accuracy of the evaluation depends on the skill of the evaluation operator.

With the foregoing in view, it is an object of the present invention to solve the above conventional problems and detect distortions in all directions by one computation in a shape evaluation which irradiates a light on a shape surface, simulating the projected line of the light on the computer.

It is another object of the present invention to decrease the number of computations required for calculating a characteristic line used for the shape evaluation, and to decrease the computing time.

It is still another object of the present invention to perform shape evaluation by such a characteristic line as a reflection line and highlight line easily without depending on the evaluation operator, and it is still another object to timely change such a characteristic line as a reflection line and highlight line, and enable evaluation by a dynamic shape.

The present invention can have each aspect of a shape evaluation method, shape evaluation device, a device having the shape evaluation device and a program medium.

In the present invention, a characteristic line for evaluating shape by performing simulation is calculated using an annular light source or concentric light source, instead of a rectilinear light source, so that a characteristic line that can observe distortion in all directions is determined by one computation.

The annular light source does not emit lights from the entire face inside the circle from the center to the edge of the circle, but emits linear or annular lights using the edge of the circle having a circular shape.

The shape evaluation of the present invention is a shape evaluation for evaluating a curved surface of a shape by a characteristic line, wherein the characteristic line is a circular highlight line which is formed on the curved surface by an annular light source in an arbitrary direction in a three-dimensional space irradiating the curved surface, or a circular reflection line which is reflected on the curved surface and entering a view point position. Here the curved surface includes a plane.

This characteristic line is formed by extracting a point, where the light from the annular light source irradiates or reflects on the curved surface, from the points on the curved surface by computing. The shape evaluation device has computing means for extracting a point, where the light from the annular light source irradiates or reflects on the curved surface, from the points on the curved surface, and generating the characteristic line.

In the computing for extracting a point that forms the characteristic line from the points on the curved surface, a vector of which distance to a circle in the three-dimensional space having a same diameter, and a same position and direction as the annular light source, is within a predetermined range among the vectors in a predetermined direction that pass through a point on the surface, and a point where the vector passes through on the curved surface is determined.

The circular highlight line can be acquired by determining a vector of which a distance to a circle in the three-dimensional space having the same diameter and same position and direction as the annular light source, is within a predetermined range among the vectors in normal line directions in the points on the surface, and acquiring a point where the vector passes through on the curved surface.

The circular reflection line can be acquired by determining a vector of which a distance to a circle on the three-dimensional space having the same diameter and same position and direction as the annular light source is within a predetermined range among the vectors in a direction symmetric with the vector direction from a point to a view point with respect to a normal line at a point on the curved surface where the vector passes through, and determining a point where the vector passes through on the curved surface to a view point with respect to a normal line through the point.

The character line may be a band having a width instead of a curve. The curve is one line of a curve determined by points at which the distance between the vector and the circle is zero, and the band is formed by 2 lines of curves determined by points at which the distance between the vector and the circle is an upper limit value and a lower limit value in a predetermined range.

More specifically, this computing is comprised of a step of determining a distance vector that represents the distance between the circle and the vector, a step of determining a distance function from the distance vector, and a step of determining a point on a curved surface of which distance function value is a predetermined value.

In the present invention, the center and/or the radius of the circle is/are changed with time so that the characteristic line becomes a dynamic shape which changes with time. This time-based change may be applied to a plurality of circles so that a plurality of characteristic lines.

A characteristic location, such as a bent portion on the evaluation surface, can be extracted by changing the center and/or the radius of a plurality of circles with time, and forming a connected line where discontinuous points of the characteristic line at each point of time are connected in a time sequence.

The computing device of the shape evaluation device comprises: a distance vector computing unit for determining a distance vector representing a distance between the circle and the vector; a distance function unit for determining a distance function from the distance vector; and a distance function computing unit for determining a point on a curved surface where the value of the distance function is a predetermined value.

If a circular highlight line is determined in the distance vector computing unit of the computing means, the distance between the vector in the normal line direction and the circle at a point on the curved surface is calculated, and the circular highlight line is formed at the point based on the calculated distance.

If a reflection line/highlight line is determined in the distance vector computing unit of the computing means, the distance between the vector in a symmetric direction with the vector direction from a point on a curved surface to a view point with respect to the normal line direction at this point and the circle is calculated for this point, and the circular reflection line is formed based on the calculated distance.

The distance function computing unit of the computing unit forms one line of a curve by determining a point at which the distance between the vector and the circle is zero, and forms two lines of a curve by determining points at which the distance between the vector and the circle are the upper limit value and the lower limit value of a predetermined range, and forms a band by these curves.

The computing based on the distance function can be performed by an analytical solution of a quartic equation acquired from the differential equation of the distance function, so such a calculation processing as acquiring an optimum value by repeating numeric calculation while changing parameters is unnecessary, and real-time computing becomes possible.

The computing means also forms a characteristic line which changes with time by changing the center and/or radius of the circle with time. Also the computing means forms a plurality of characteristic lines by performing this computing for a plurality of circles. Also the computing means forms a connected line by changing the center and/or radius of a plurality of circles with time, and connecting the bent point and the deviation ($C^2$ discontinuity) of the characteristic line at each point of time in a time sequence.

Therefore according to the present invention, a characteristic line for observing distortion in all the directions can be acquired by one computation, and the computing is simply substituting a numeric value for the analytical solution, so computing time can be decreased compared with the case of using numeric calculation.

The program medium of the present invention is a program medium that records programs for a computer to execute computing to form a characteristic line on a shape surface, where the characteristic line is a circular highlight line or a circular reflection line which an annular light source in an arbitrary direction in a three-dimensional space forms on this surface, and computing is extracting a point at which the light from the annular light source irradiates or reflects on this curved surface from the points on the curved surface.

A program is for a computer to execute computing to determine a point where a vector, of which a distance to a circle on the three-dimensional space having a same diameter and same position and direction as the annular light source is within a predetermined range, passes through the curved surface among the vectors in predetermined positions that pass through on a point on the curved surface. More specifically, the program comprises: a step of determining a distance vector representing a distance between the circle and the vector; a step of determining a distance function from the distance vector; and a step of determining a point on a curved surface where the value of the distance function is a predetermined value.

A CAD device for supporting shape design by a computer has a shape evaluation device that evaluates the curved surface of the shape by a characteristic line, and the shape evaluation device displays a circular highlight line or a circular reflection line, which an annular light source in an arbitrary direction in the three-dimensional space forms on the curved surface, on a display.

A CAM device for supporting the generation of execution data to be used for producing a setting target based on the shape data of the target by a computer has a shape evaluation device which evaluates the curved surface based on the shape data and/or execution data by a characteristic line, and the shape evaluation device displays a circular highlight line or a circular reflection line, which an annular light source in an arbitrary direction in the three-dimensional space forms on the curved surface, on a display.

As described above, according to the present invention, distortion in all the directions can be detected by one computation.

Also the number of computations required for calculating a characteristic line used for shape evaluation can be decreased, and computing time can be decreased.

Also shape evaluation based on such a characteristic line as a reflection line and highlight line can be easily performed without depending on an evaluation operator.

Also such a characteristic line as a reflection line and highlight line can be a dynamic shape which changes with time.

BRIEF DESCRIPTION OF THE DRAWINGS

FIG. 8 are diagrams depicting an analytical solution of a quartic equation;

FIG. 14 are diagrams depicting examples of circular highlight lines;

FIG. 15 are diagrams depicting examples of circular highlight lines;

FIG. 18 are diagrams depicting examples of a characteristic line formed by one annular light source;

FIG. 21 are diagrams depicting the case when there are a plurality of annular light sources;

FIG. 24 is a flow chart depicting an example of extracting a characteristic portion of the surface shape from the characteristic line;

FIG. 27 are diagrams depicting the shape evaluation based on the reflection line and highlight line;

FIG. 29 are diagrams depicting the conventional shape evaluation based on a characteristic line.

EXPLANATION OF REFERENCE SYMBOLS

Figure 1:
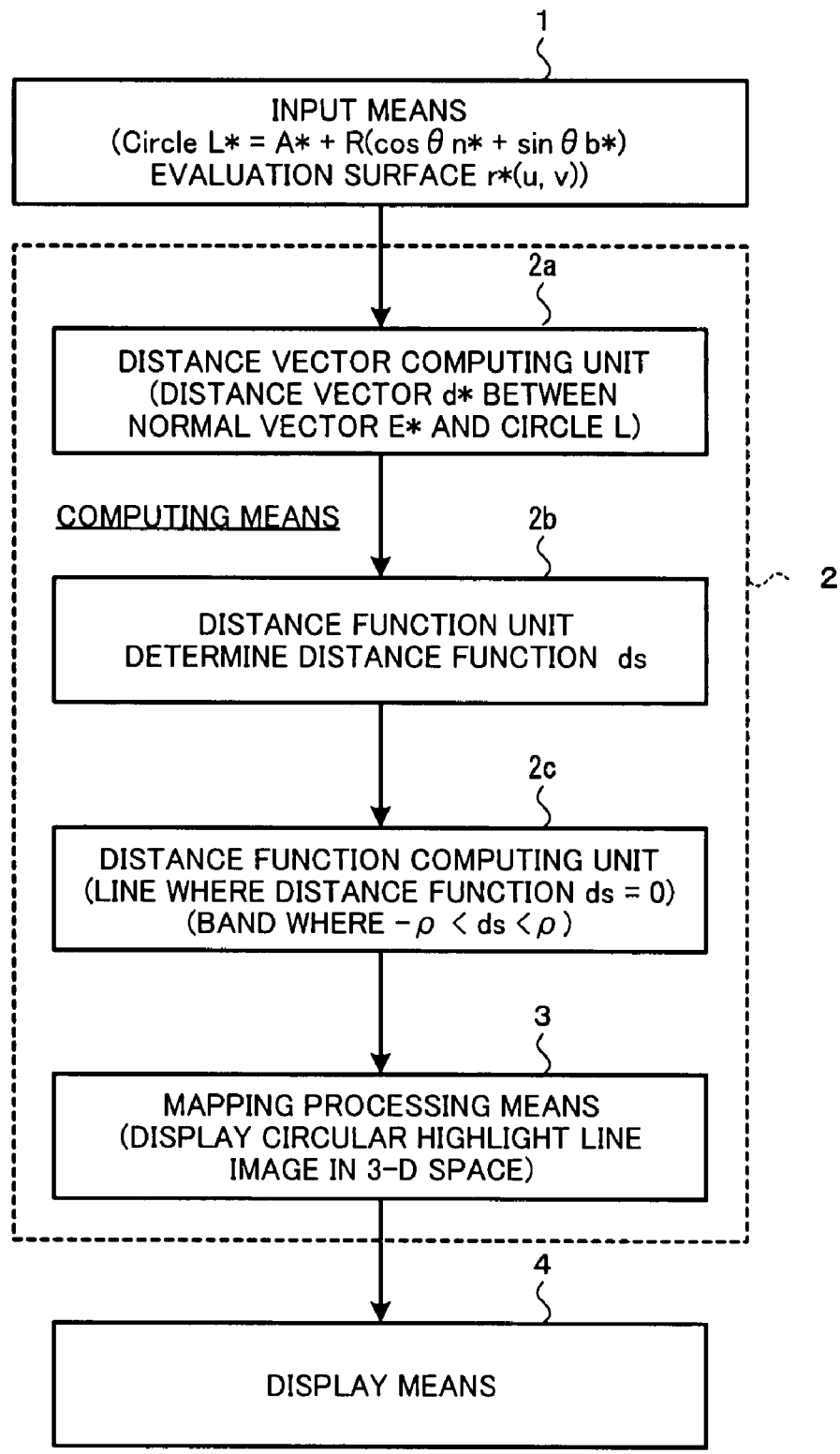
FIG. 1 is a diagram depicting a general configuration of the shape evaluation method and shape evaluation device of the present invention.

1 Input means
2 Computing means
2a Distance vector computing unit
2b Distance function unit
2c Distance function computing unit
3 Mapping means
4 Display means
10 Evaluation surface
11 Circular highlight line
21 Input means
22 Computing means
22a Vector computing means
22b Distance vector computing means
22c Distance function unit
22d Distance function computing unit
23 Mapping means
24 Display means
100 Evaluation surface
101 Line light source
102 Reflection line
103 Highlight line

BEST MODE FOR CARRYING OUT THE INVENTION

Embodiments of the present invention will now be described with reference to the drawings.

FIG. 1 is a diagram depicting a configuration of the shape evaluation method and shape evaluation device of the present invention.

In the shape evaluation device of the present invention, an annular light source in an arbitrary direction in a 3-D space forms a characteristic line of a circular highlight line or circular reflection line on an evaluation target curved surface, and the shape is evaluated by observing this characteristic line. The shape evaluation device has computing means which forms a characteristic line by extracting a point where the light from the annular light source irradiates or reflects on the evaluation target curved surface from the points on the curved surface.

First the configuration for determining a circular highlight line as the characteristic line will be described with reference to FIG. 1 to FIG. 10. The circular highlight line is a line formed by the light from an annular light source irradiating on a surface of an evaluation target shape. Computing means of the shape evaluation device of the present invention calculates the circular highlight line not by detecting a position where the light irradiated from the annular light source reaches the curved surface, just like physical phenomena, but by considering the normal lines on a plurality of points on a curved surface of the evaluation target shape, detecting a normal line of which distance to the annular light source become shortest (zero or the minimum) on the extended line thereof among the plurality of normal lines, and calculating the circular highlight line using the plurality of points on the curved surface where this normal line passes through.

Detecting a point of a circular highlight line on a curved surface from the annular light source side has a problem in terms of the calculation speed and the calculation stability since numerical calculation based on a numerical integration method, such as the Runge-Kutta method is used. In the present invention, a normal line which contacts the annular light source on the extension thereof is detected among a plurality of normal lines, and the circular highlight line is calculated by a point on the curved face where this normal line passes through. This calculation operation corresponds to a processing for calculating the shortest distance between a straight line and a circle corresponding to the annular light source which is arbitrarily set in a 3-D space, and this computing is in the end solving a quartic equation. Since it is known that an analytical solution exists in a quartic equation, this computing means simply performs calculation with substituting a numeric value for the analytical solution. Therefore the computing will be performed in a shorter time compared with the conventional numeric calculation based on a numerical integration method.

In the following description, it is assumed that a curved surface r, which is a free-form surface, is represented by a parametric surface, and for the parametric surface representation and vector, the symbol "*" is attached to the reference symbol.

Computing means 2 detects a vector E* of which distance d to a circle L* in the 3-D space which has a same diameter (R) and same center and direction (A*) as the annular light source, among the vectors E* in a direction of a normal line which passes through a point on the curved surface r*, and determines a point where the vector E* passes through on the curved surface r* as a point where the circular highlight line passes through.

The parametric surface is represented by dividing a shape into a plurality of curved surface elements, and connecting the curved surface elements smoothly with each other, and a point on the parametric surface is defined as a map from the parameter space to the 3-D real space based on parameters u and v ($0 \leq u, v \leq 1$). As a parametric surface, Coons surface, Bezier surface and NURBS (Non Uniform Rational B-Spline), for example, are known.

This computing means 2 has a distance vector computing unit 2a for determining a distance vector d* representing a distance between the circle L* and the normal line vector E*, a distance function unit 2b for determining a distance function from the distance vector d*, and a distance function computing unit 2c for determining a point on a curved surface r* where the value of the distance function is a predetermined value.

The shape evaluation device of the present invention further has input means 1 for inputting computing conditions, such as an evaluation target curved surface r* (u, v) and circle L* corresponding to the annular light source, to the computing means 2, mapping processing means 3 for displaying an image of the circular highlight line, which is the characteristic line acquired by the computing means 2, in the 3-D space, and display means 4.

A CAD device or a CAM device having this shape evaluation device can be implemented by connecting the shape evaluation device of a normal CAD device or CAM device and exchanging the shape data, or adding the above mentioned computing function or program to perform the computing to the shape data processing means of the CAD device or CAM device.

The display means 4 superimposes and displays the circular highlight lines which are characteristic lines as a 3-D image on the surface of the evaluation target shape. The user can observe and evaluate the status of the curved surface using the displayed 3-D image.

Figure 3:
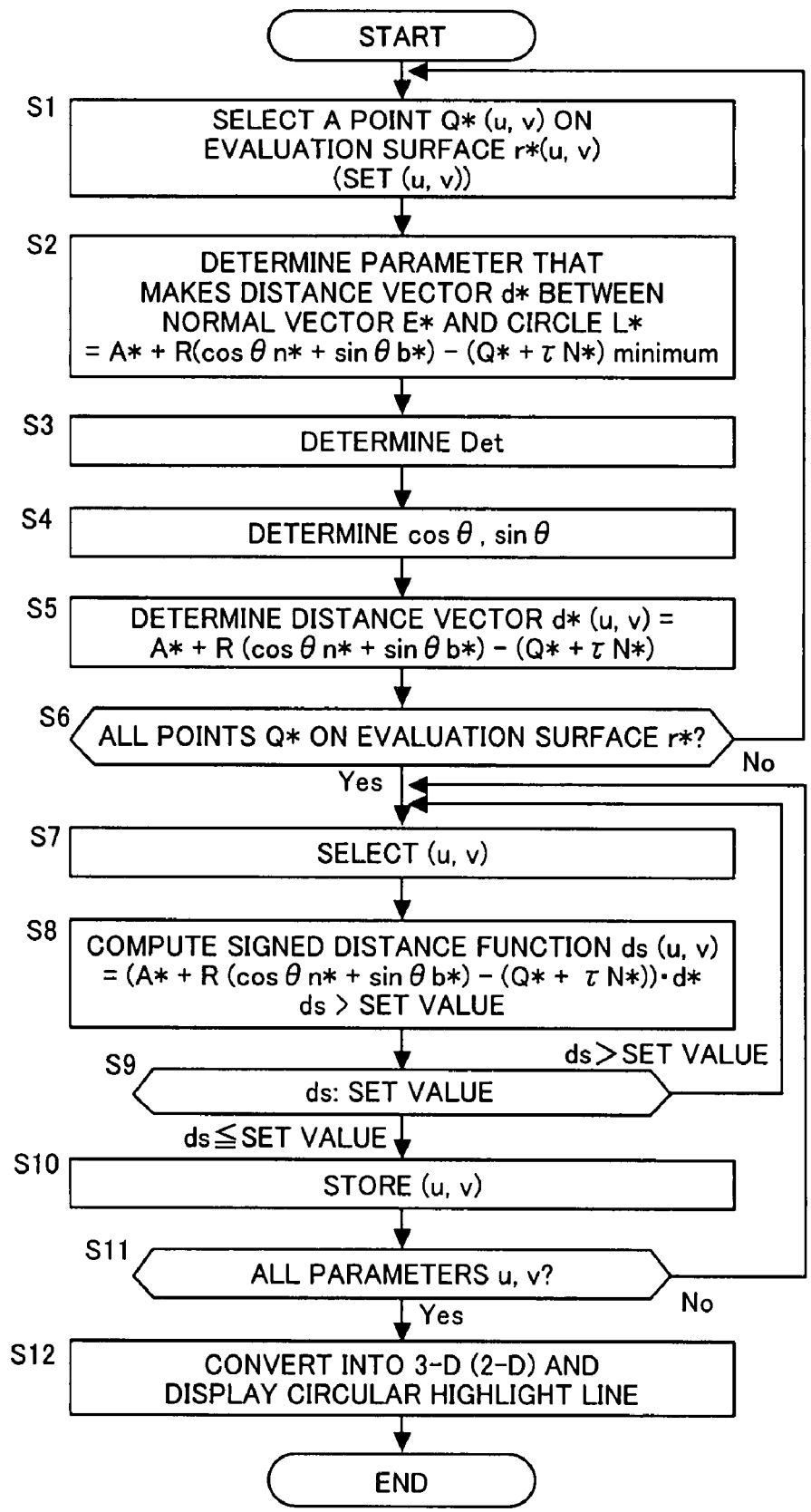
FIG. 3 is a flow chart depicting computing for forming a characteristic line of shape evaluation of the present invention.
Figure 4:
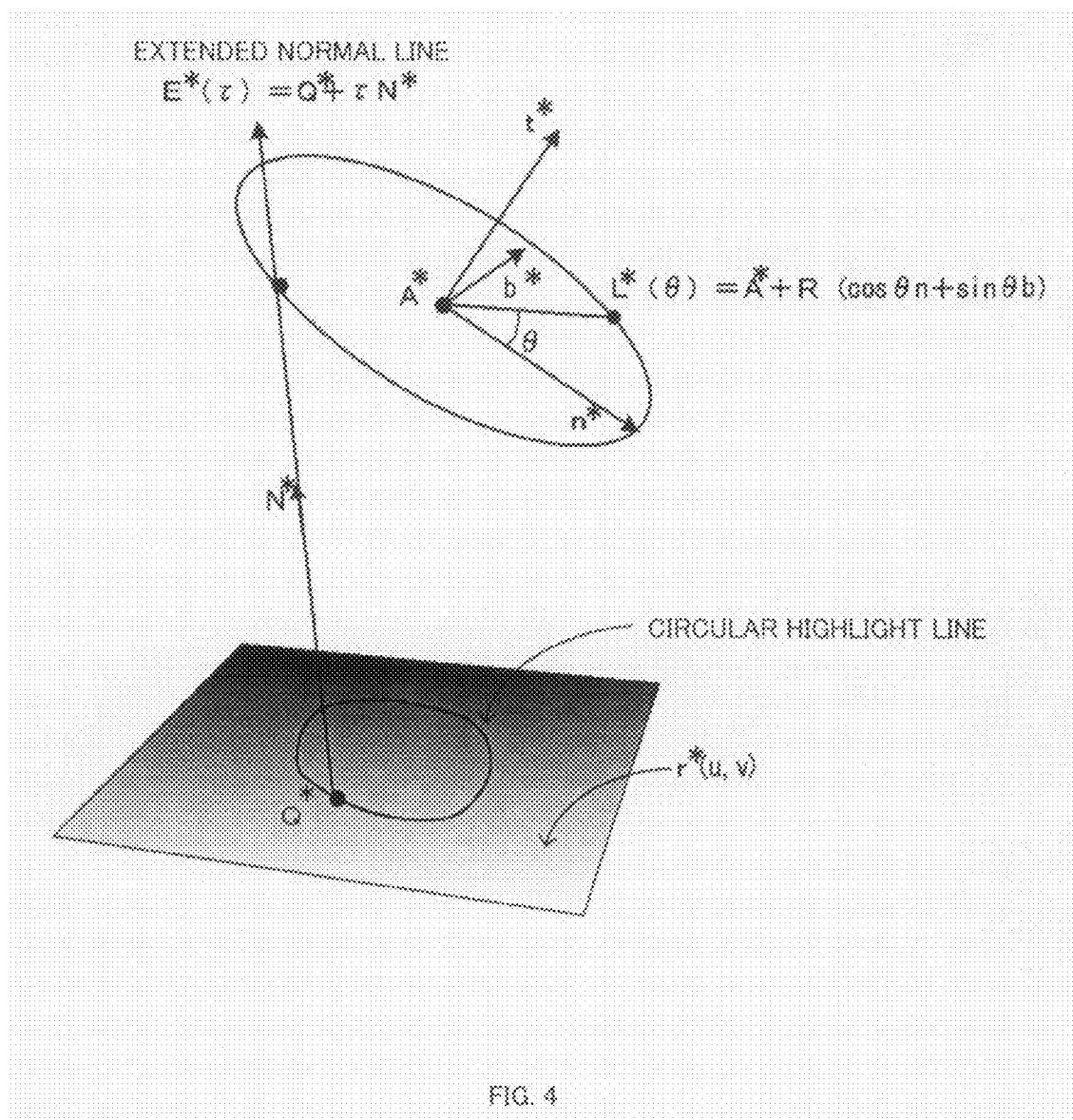
FIG. 4 is a diagram depicting the definition of a circular highlight line of the present invention.

Now the computing for forming the shape evaluation characteristic line of the present invention will be described with reference to the diagram in FIG. 2, flow chart in FIG. 3 diagram depicting the definition of the circular highlight line in FIG. 4, diagram depicting the definition of the distance vector in FIG. 5, and the diagrams depicting the analytical solutions of the quartic equations in FIG. 6 to FIG. 8. The symbol (S) in FIG. 2 corresponds to the symbol (S) in the flow chart in FIG. 3.

Figure 2:
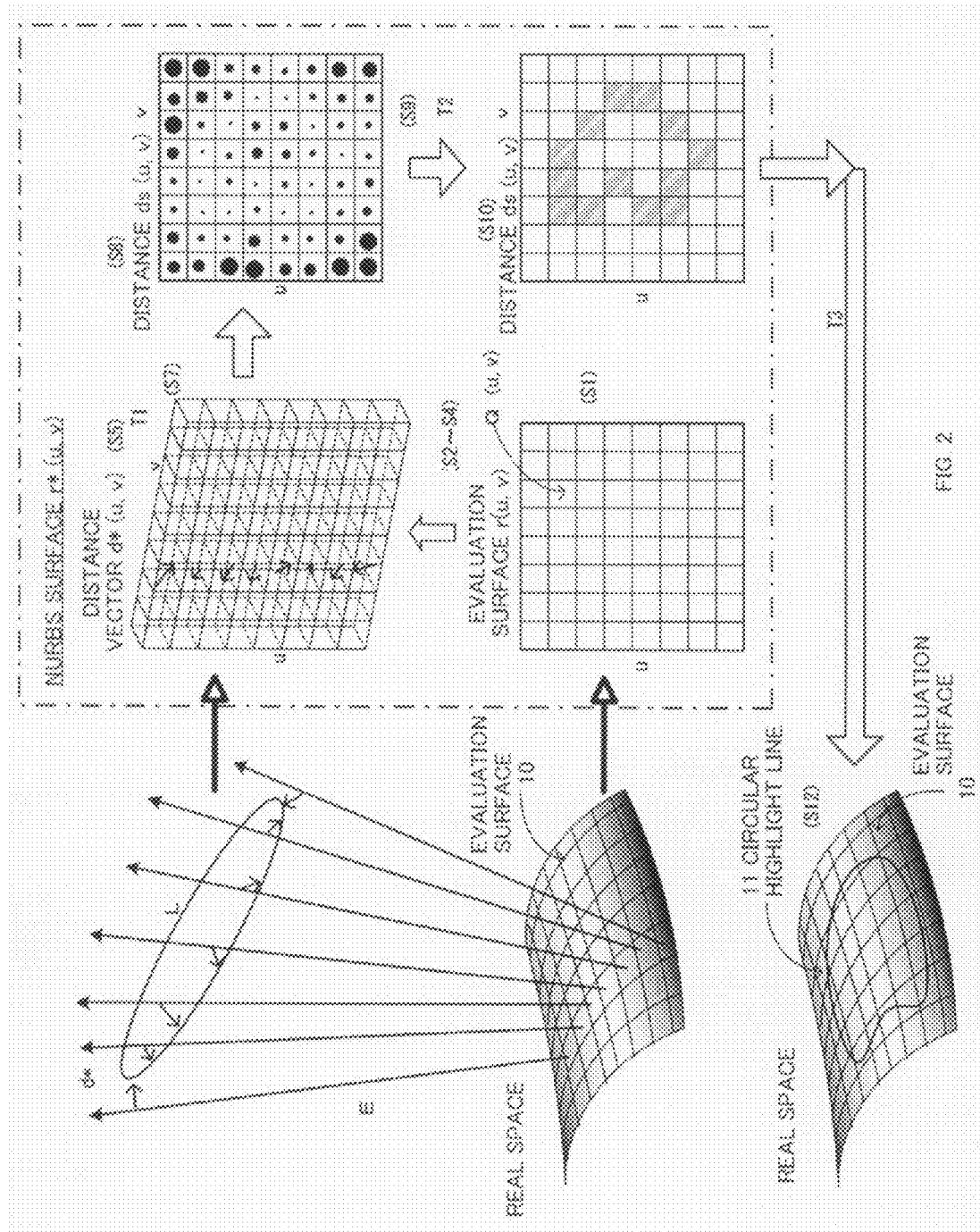
FIG. 2 is a diagram depicting computing for forming a characteristic line of shape evaluation of the present invention.

FIG. 2 shows a circular highlight line 11 which is an example of the characteristic line determined in the shape evaluation of the present invention. FIG. 2 shows a procedure to determine the circular line 11, which is formed by the light irradiated from an annular light source (corresponds to the circle L in FIG. 2) in a 3-D real space on an evaluation surface 10 in the same real space, by simulation.

The evaluation surface 10 in the real space is represented by the parametric surface of the evaluation surface r(u, v). This evaluation surfaced r(u, v) can be acquired by inputting from the input means 1, or reading from the storage means, which is not illustrated, or converting the shape data represented by another format into parametric surface representation.

In the shape evaluation of the present invention, a normal line E* of which distance d to the annular light source (circle L*) in the extension thereof becomes the minimum, among a plurality of normal lines E* of a plurality of points on the curved surface (evaluation surface 10) of the evaluation target shape, and a circular highlight line is determined by a plurality of points on the curved surface where the detected plurality of normal lines E* pass through (see left portion of FIG. 2).

In order to determine the circular highlight line by computing using simulation, the distance vector d*(u, v) to the annular light source is determined for each point Q on the evaluation surface r in the uv parameter space (indicated by the dash and dotted line in FIG. 2), the distance ds(u, v) is determined from this distance vector d*(u, v), and a point Q at which the distance ds(u, v) is the shortest is determined by computing (see the right portion in FIG. 2).

By setting the parameters u and v ($0 \leq u, v \leq 1$) in the evaluation surface r*(u, v) represented by this parametric surface (NURBS surface), the point Q*(u, v) on the evaluation surface r*(u, v) is selected. The selection of this point Q* corresponds to the selection of a point on the evaluation surface 10 in the real space (S1).

The circular highlight line can be defined as a set of points on the curved surface where distance d between the annular light source L* and the extended line E* of the normal line N* is zero. FIG. 4 is a diagram depicting the circular highlight line.

Here the circle L* corresponding to the annular light source is represented by a parametric surface by the following Expression (1).

$$L*(\theta) = A* + R(\cos\theta n* + \sin\theta b*) \quad (1)$$

A* and R are the center position and radius of a circle representing the annular light source, and the unit vectors n* and b*, which are perpendicular to each other, exist on a surface which includes the annular light source. The vectors n* and b* form the unit vector t*($=n* \times b*$). This unit vector t* is vertical to the surface that includes the annular light source.

The vector E* is an extension of the unit normal vector N* at the point Q* on the evaluation surface r*(u, v), and is given by the following Expression (2).

$$E^*(\tau) = Q^* + \tau N^* \quad (2)$$

Here $\tau$ is a parameter, and the unit normal vector N* is given by the following Expression (3).

$$N^*(u,v) = (ru^*(u,v) \times rv^*(u,v))/|ru^*(u,v) \times rv^*(u,v)| \quad (3)$$

For the selected point Q*, the distance vector d*(u, v) is determined by the following (S2) to (S4).

Figure 5:
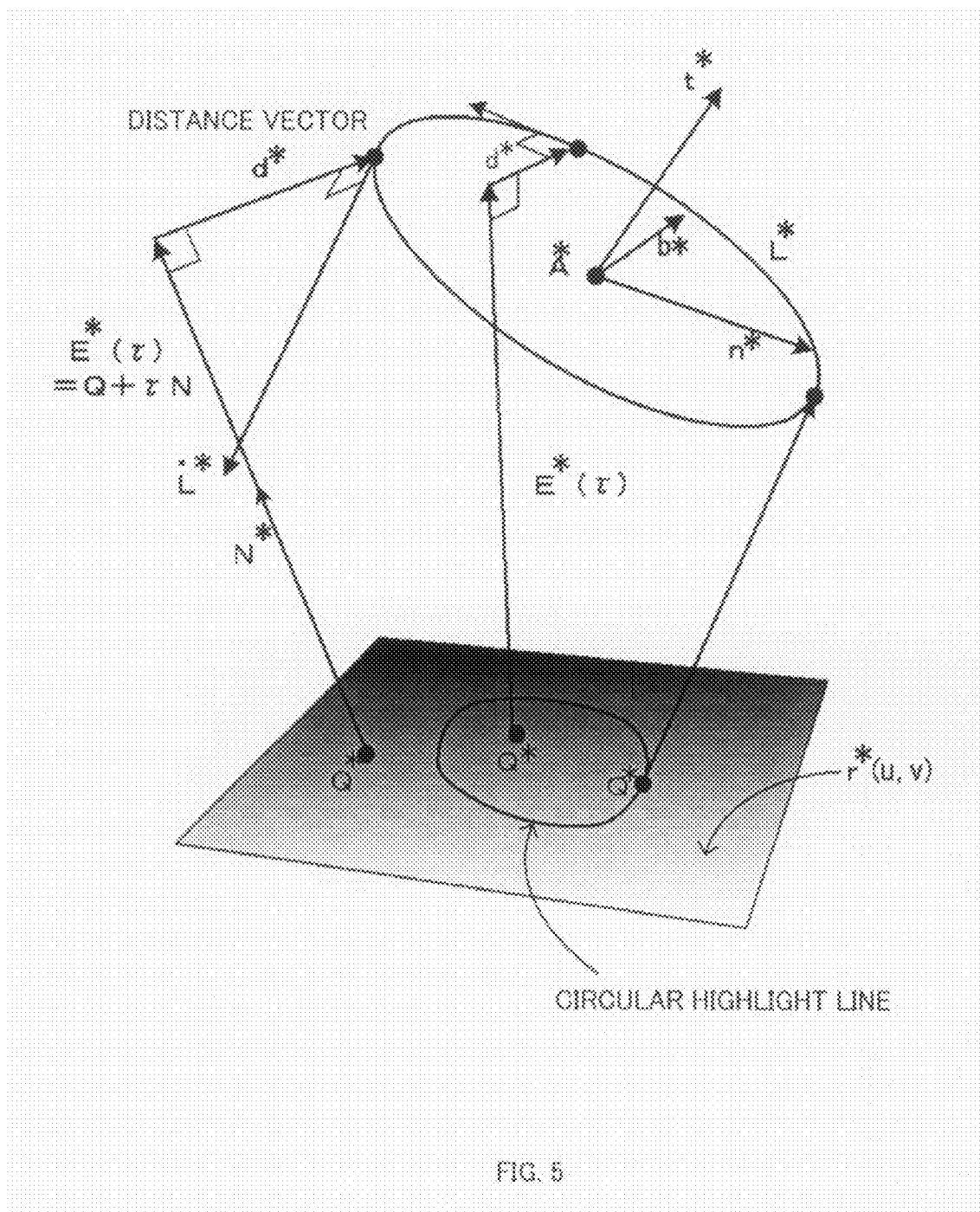
FIG. 5 is a diagram depicting the definition of a distance vector of the present invention.

FIG. 5 is a diagram depicting the definition of the distance vector. In FIG. 5, the distance vector d* from the extended normal vector E* to the circle L*(θ) is given by the following Expression (4).

$$d^* = A^* + R(\cos\theta n^* + \sin\theta b^*) - (Q^* + \tau N^*) \quad (4)$$

If the square distance function D is expressed by the following Expression (5)

$$D(\tau,\theta) = d^* \cdot d^* = |(A^* + R(\cos\theta n^* + \sin\theta b^*)) - (Q^* + \tau N^*)|^2 \quad (5)$$

and the shortest distance is considered, then the extreme value conditions given by the partial differential equation D in the following Expression (6) must be satisfied.

$$D\tau(\tau,\theta) = D\theta(\tau,\theta) = 0 \quad (6)$$

This conditions could be expressed by the following Expressions (7) and (8) using Expression (5).

$$(A^* - Q^*) \cdot N^* + R(\cos\theta n^* \cdot N^* + \sin\theta b^* \cdot N^*) = \tau \quad (7)$$

$$(A^* - Q^* - \tau N^*) \cdot (\cos\theta b^* - \sin\theta n^*) = 0 \quad (8)$$

This conditions is expressed by the following Expression (9) in a matrix format.

[Expression 1]

$$\begin{pmatrix} Rn^* \cdot N^* & Rb^* \cdot N^* \\ (A^* - Q^* - \tau N^*) \cdot b^* & (\tau N^* - A^* + Q^*) \cdot n^* \end{pmatrix} \begin{pmatrix} \cos\theta \\ \sin\theta \end{pmatrix} = \begin{pmatrix} \tau - (A^* - Q^*) \cdot N^* \\ 0 \end{pmatrix} \quad (9)$$

The above expression can be solved as follows using Cramer's Law.

$$\cos\theta = ((\tau - (A^* - Q^*) \cdot N^*)(\tau N^* - A^* + Q^*) \cdot n^*)/Det$$

$$\sin\theta = ((\tau - (A^* - Q^*) \cdot N^*)(\tau N^* - A^* + Q^*) \cdot b^*)/Det \quad (10)$$

Det is given by the following Expression (11), based on matrix expression (9).

$$Det = R(n^* \cdot N^*)(Q^* + \tau N^* - A^*) \cdot n^* + R(b^* \cdot N^*)(Q^* + \tau N^* - A^*) \cdot b^* \quad (11)$$

Here if $$B^* = A^* - Q^*, \alpha = n^* \cdot N^*, \beta = b^* \cdot N^*, \gamma = B^* \cdot n^*, \delta = B^* \cdot b^*, \epsilon = B^* \cdot N^* \quad (12)$$

then Expression (11) can be converted into the following Expression (13).

$$Det = R\alpha(\alpha\tau - \gamma) + R\beta(\beta\tau - \delta) \quad (13)$$

If the restrictions of the following Expression (14) are applied to Expression (10) using Expression (12), $$\cos^2\theta + \sin^2\theta = 1 \quad (14)$$

then Expression (15) on $\tau$ can be acquired.

$$c_4\tau^4 + c_3\tau^3 + c_2\tau^2 + c_1\tau + c_0 = 0 \quad (15)$$

Coefficients $C_4$, $C_3$, $C_2$, $C_1$ and $C_0$ are expressed by the following Expressions (16) to (20).

$$c_4 = \alpha^2 + \beta^2 \quad (16)$$

$$c_3 = -2((\alpha\gamma + \beta\delta) + (\alpha^2 + \beta^2)\epsilon) \quad (17)$$

$$c_2 = (\alpha^2 + \beta^2)\epsilon^2 + 4\epsilon(\alpha\gamma + \beta\delta) + (\gamma^2 + \delta^2) - R^2(\alpha^2 + \beta^2)^2 \quad (18)$$

$$c_1 = -2((\alpha\gamma + \beta\delta)\epsilon^2 + (\gamma^2 + \delta^2)\epsilon - R^2(\alpha^2 + \beta^2)(\alpha\gamma + \beta\delta)) \quad (19)$$

$$c_0 = (\gamma^2 + \delta^2)\epsilon^2 - R^2(\alpha\gamma + \beta\delta)^2 \quad (20)$$

Therefore the parameter $\tau$ can be determined by solving the quartic equation. $\tau$ is determined by solving Expression (15) for the point Q*(u, v) on the parametric surface r*(u, v), cos θ and sin θ are determined by Expression (10), and the distance vector d* is determined by Expression (4). If Det is not zero, then the quartic equation for solving the parameter $\tau$ has an analytical solution, and the distance vector d* can be determined by this analytical solution.

Figure 6:
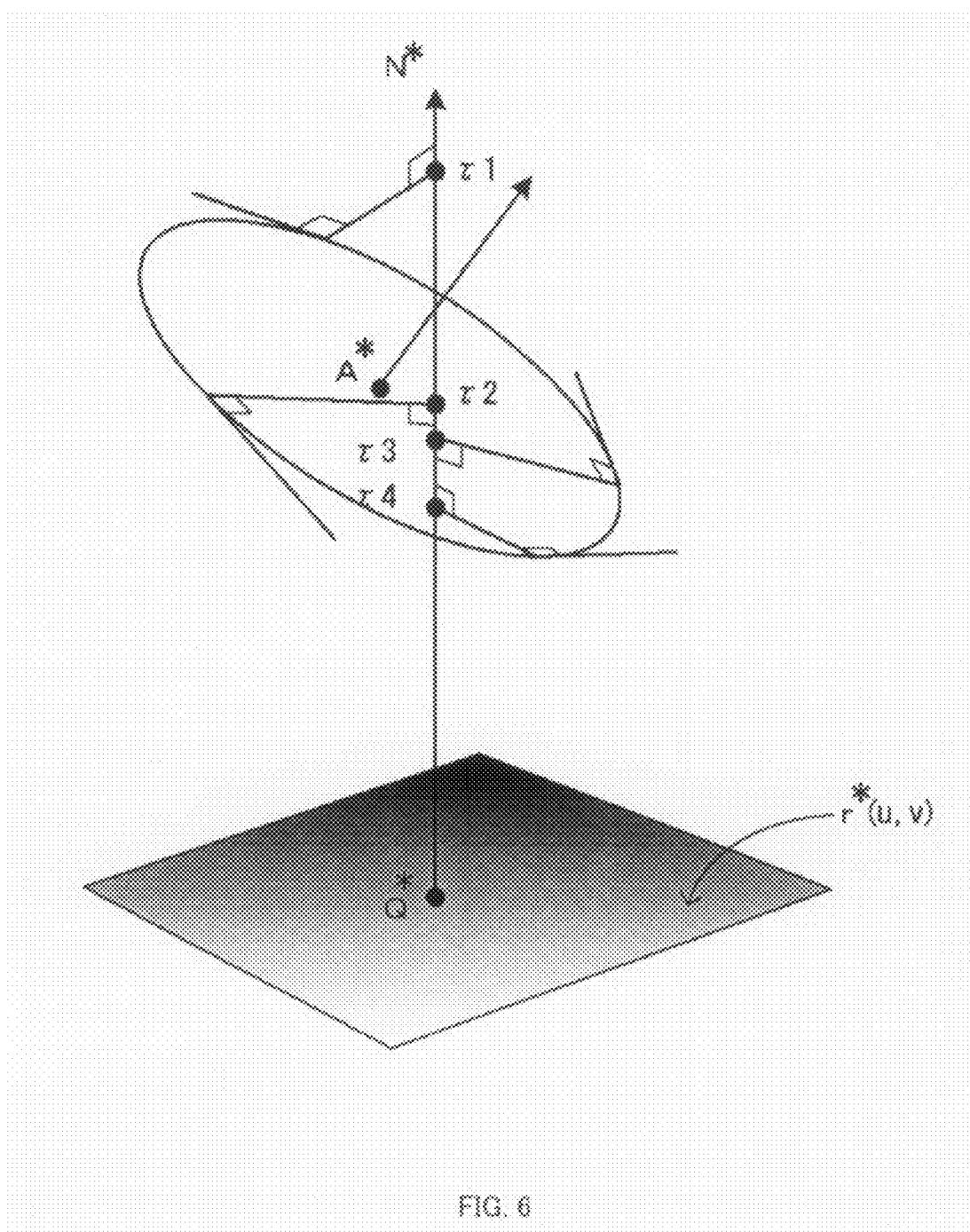
FIG. 6 is a diagram depicting an analytical solution of a quartic equation.
Figure 7:
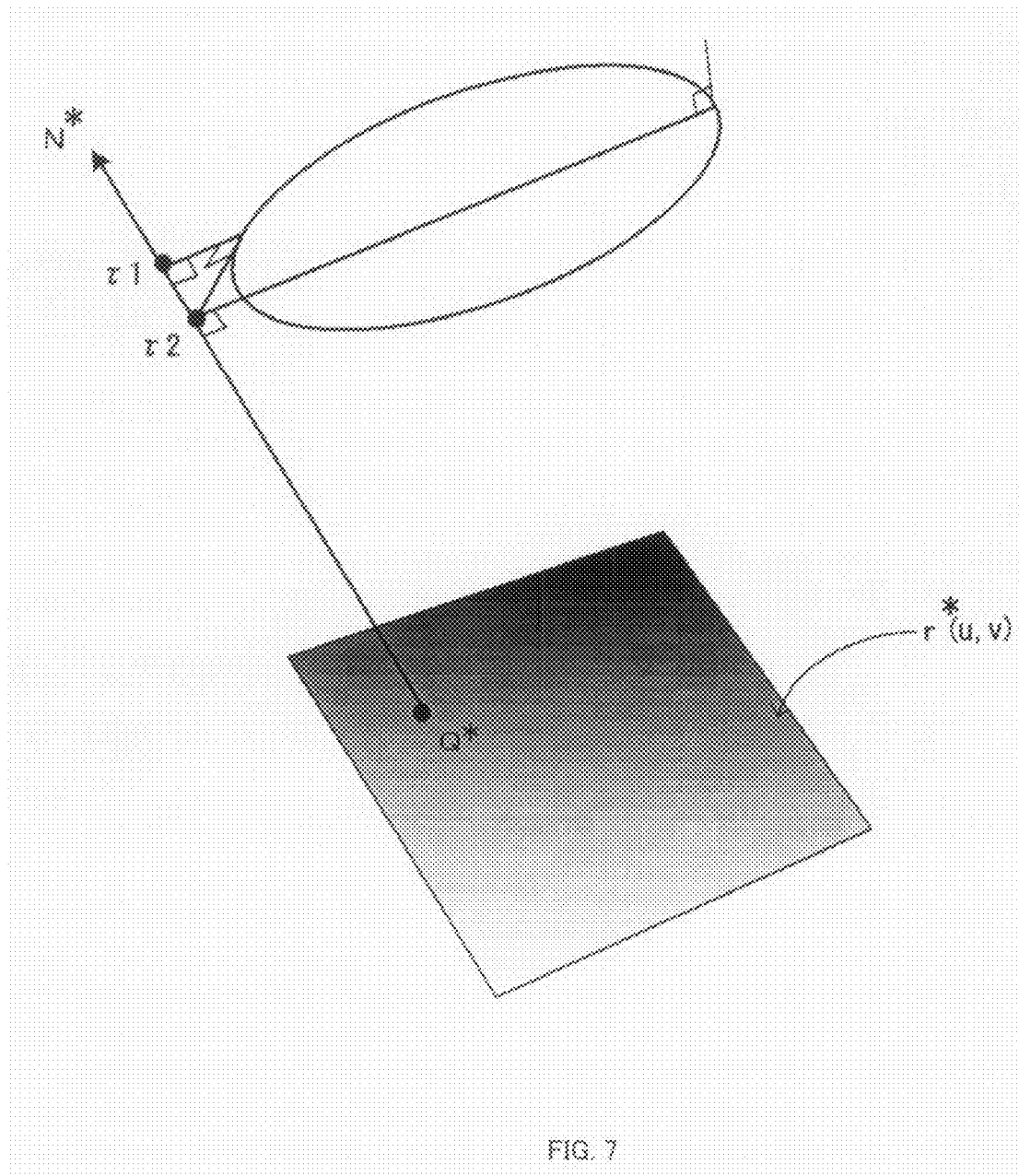
FIG. 7 is a diagram depicting an analytical solution of a quartic equation.

Here FIG. 6 and FIG. 7 are diagrams depicting the parameter $\tau$ based on a typical solution of the quartic equation. FIG. 6 is a case when the solution of the quartic equation has 4 real roots τ1 to τ4, and FIG. 7 is a case when the solution of the quartic equation has 2 real roots τ1 and τ2 and 2 imaginary roots.

The distance vector to be the shortest distance can be determined by selecting a shortest distance among the plurality of real roots.

Det becomes zero in the following 4 cases as shown in FIG. 8.

The first case is when N* and t* are parallel (FIG. 8A). In this case, the distance of the straight line and the circle in 3-D is converted into the distance in 2-D, and the distance vector d* at this time is given by the following Expression (21).

$$d^* = A^* - (Q^* + \tau N^*) - (A^* - (Q^* + \tau N^*))R/|A^* - (Q^* + \tau^*)| \quad (21)$$

$$= A^* - (Q^* + \tau N^*)(1 - R/|A^* - (Q^* + \tau N^*)|)$$

Here $\tau = \epsilon = (A^* - Q^*) \cdot N^*$.

The second case is when N* intersects with t*, and $Q^* + \tau N^* = A^* + \xi t^*$ is established (FIG. 8B). In this case, the quartic equation is given by the following Expression (22).

$$(\tau - \tau_D)^2(\tau - \epsilon - R\sqrt{(\alpha^2 + \beta^2)})(\tau - \epsilon + R\sqrt{(\alpha^2 + \beta^2)}) = 0 \quad (22)$$

Here $\tau_D = \gamma/\alpha = \delta/\beta$.

Therefore in this case, the root is $\tau 1 = \epsilon + R\sqrt{(\alpha^2 + \beta^2)}$, $\tau 2 = \epsilon - R\sqrt{(\alpha^2 + \beta^2)}$, and in FIG. 8B, the multiple root $\tau 3 = \tau 4 = \tau_D$.

The third case is when N* is perpendicular to t* (FIG. 8C). In this case, $\alpha^2 + \beta^2 = 1$, and $\alpha\gamma + \beta\delta = \epsilon$ and Det=R (τ−ε), and the quartic equation is given by the following Expression (23).

$$(\tau - \epsilon)^2((\alpha\tau - \gamma)^2 + (\beta\tau - \delta)^2 - R^2) = 0 \quad (23)$$

In the case of $\tau = \epsilon$, Det=0, but the multiple root satisfies Expression (6).

The fourth case is when N* passes through A* (FIG. 8D). In this case, $\gamma = \epsilon\alpha$ and $\delta = \epsilon\beta$, so Det=R$(\alpha^2 + \beta^2)$ (τ−ε), and the quartic equation is given by the following Expression (22), that is the same as the above mentioned second case.

Therefore the distance vector d*(u, v) is given by the above Expression (4). Now the parameter $\tau$ which satisfies the extreme value condition where the distance vector d* is the shortest (Expression (6)) is determined (S2). Also Det of the above Expression (11) is determined (S3), and cos θ and sin θ given by the above Expression (10) is determined (S4).

Using parameter τ, Det, cos θ and sin θ determined in the above steps (S2) to (S4), the distance vector d*(u, v) of Expression (4) is determined (S5). This distance vector d*(u, v) is determined for all the points Q*(u, v) on the evaluation surface r*(u, v) (S6).

The distance vector d*(u, v) in FIG. 2 is the distance vector determined in the above steps (S5) and (S6), represented in a matrix in the u, v parameter space.

Then a point on the evaluation surface at which the distance is the shortest is determined from the distance vector d*(u, v) according to steps (S7) to (S11).

The distance vector d*(u, v) is selected by setting the parameter of (u, v) (S7), and the length (distance) of the selected distance vector d* is determined. The length of the distance vector d* is evaluated by a signed distance function ds(u, v) shown in the following Expression (24).

$$ds(u,v)=(A^*+R(\cos \theta n^*+\sin \theta b^*))-(Q^*(u,v)+\tau N^* (u,v)))\cdot(N(u,v)\times dL^*(\theta)/d\theta)/|N(u,v)\times dL^*(\theta)/d\theta| \quad (24)$$

In Expression (24), $(N(u, v)\times dL^*(\theta)/d\theta)/|N(u, v)\times dL^*(\theta)/d\theta|$ is a unit vector in a same direction as the distance vector d*, and $dL^*(\theta)/d\theta$ is a differentiation of the circle L*, as shown in the following Expression (25).

$$dL(\theta)/d\theta=R(-\sin \theta n^*+\cos \theta b^*) \quad (25)$$

In the above expression, $d^*\cdot N^*=0$, and $d^*\cdot dL^*(\theta)/d\theta=0$, and because of the relationship $(N^*\times dL^*(\theta)/d\theta)\cdot N^*=0$ and $(N^*\times dL^*(\theta)/d\theta)\cdot dL^*(\theta)/d\theta=0$, which is acquired based on the definition of the scalar product, the distance vector d* is in parallel with $(N(u, v)\times dL^*(\theta)/d\theta)$.

For the circular highlight line, the signed distance function ds(y, v) is computed (S8), and a parameter (u, v) of which value becomes a set value or less is determined (S9, S10, S11), then a point Q on the evaluation surface is determined in real space using the determined parameter (u, v), and a set of these points Q becomes the circular highlight line (S12).

In FIG. 2, the matrix in step (S8) roughly indicates the value of the signed distance function ds (u, v) using the diameter of the point, and the matrix in step (S10) roughly indicates the parameter (u, v) when the signed distance function ds (u, v) is a set value or less.

The value of the signed distance functions ds (u, v) shows the distance between the distance vector d* and the annular light source, and a point on the evaluation surface where this distance is "0" is a point on the circular highlight line.

If the set value is set to "0" in step (S9), the value of the signed distance function ds(u, v) does not always become "0" depending on the setting accuracy of the parameter (u, v), so a set value with which the value of the signed distance functions ds(u, v) is substantially regarded as "0" is selected.

Also by setting the upper limit value ds=ρ and the lower limit value ds=-ρ, for the set value, the circular highlight line can be determined as a band having about a 2ρ width.

Figure 9:
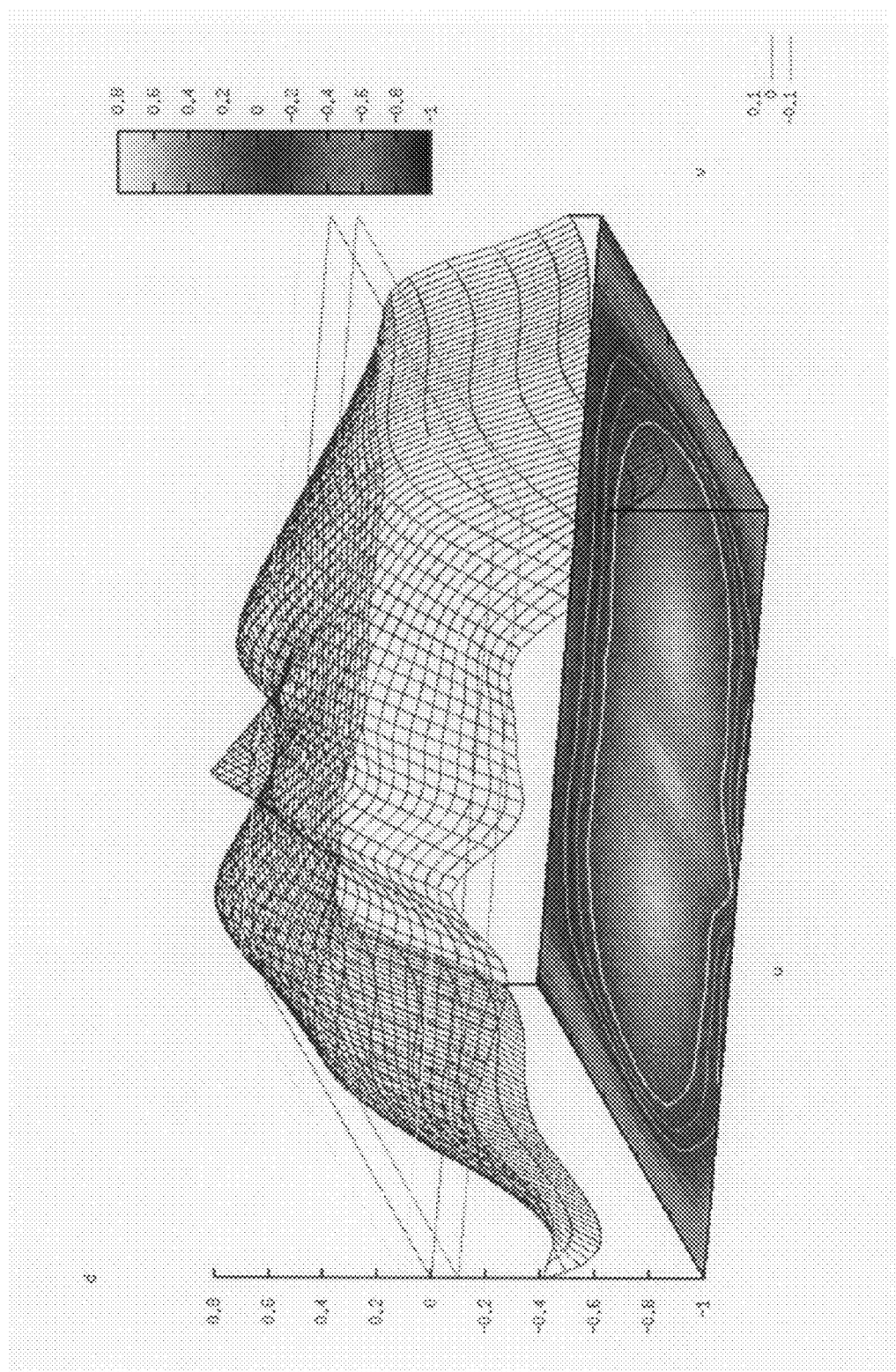
FIG. 9 is a diagram depicting a computing example of a signed distance function ds (u, v)

FIG. 9 shows an example of the computing the signed distance function ds(u, v). In FIG. 9, the mesh form indicates the value of the signed distance functions ds(u, v) in the u, v parameter space as a displacement from the reference position.

In this mesh form, the circular highlight line can be determined by determining the surface of set value ρ=0, and the band of the circular reflection line can be determined by determining the two surfaces of set values ρ=0.1 and −0.1.

The computing time T includes the computing time T1 for the distance vector d* at each point of the u and v parameters, the computing time T2 for determining the magnitude of the distance vector d* and the time T3 for mapping the circular highlight line in 3-D real space, and all of these times depend on the number of lattice points at which computing is performed in the u and v parameter space.

Figure 10:
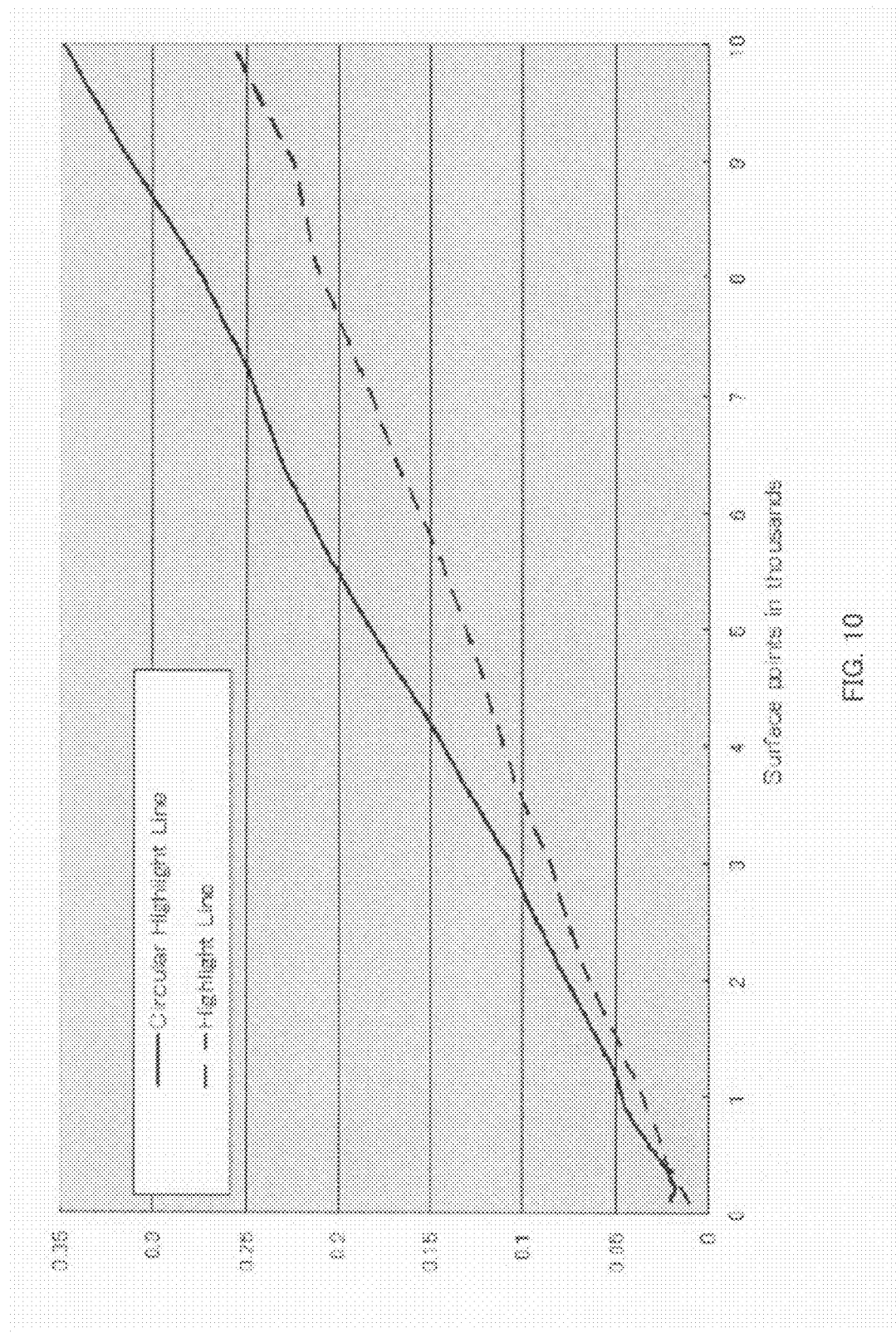
FIG. 10 is a graph depicting computing time.

In the above computing time, the computing time T2 for determining the magnitude of the distance vector d* is computing for determining a numeric value of the analytical solution of the quartic equation, so in FIG. 10, the solid line indicates the case of the circular highlight line of the present invention, and the broken line indicates the case of the highlight line by a conventional rectilinear light source. In the case of the highlight line, highlight lines in different directions must also be determined, so at least double the computing time in FIG. 10 is required, and the total time to be required is longer than that of the circular highlight line.

Now a configuration for determining a circular reflection line as a characteristic line will be described with reference to FIG. 11 to FIG. 13. The circular reflection line is a reflection line formed on a curved surface when the light from the annular light source is reflected on a curved surface of the evaluation target shape, and is observed at the view point position.

The circular reflection line is formed by calculating a distance between a vector in a direction symmetric with a vector direction from a point on the curved surface to a view point with respect to the normal line direction through the point and the circle.

The computing means of the shape evaluation device of the present invention does not calculate the circular reflection line by detecting a point on the curved surface when the light irradiated from the annular light source is reflected on the curved surface and reaches the view point, just like the case of physical phenomena, but considers normal lines at a plurality of points on the curved surface of the evaluation target shape, corresponds the vector in a direction symmetric with the vector direction from the point to the view point to the normal line of the circular highlight line for these plurality of normal lines, detects a vector of which distance to the circle is shortest (zero or minimum), and calculates the circular reflection line using the plurality of points on the curved surface where this vector passes through.

Figure 11:
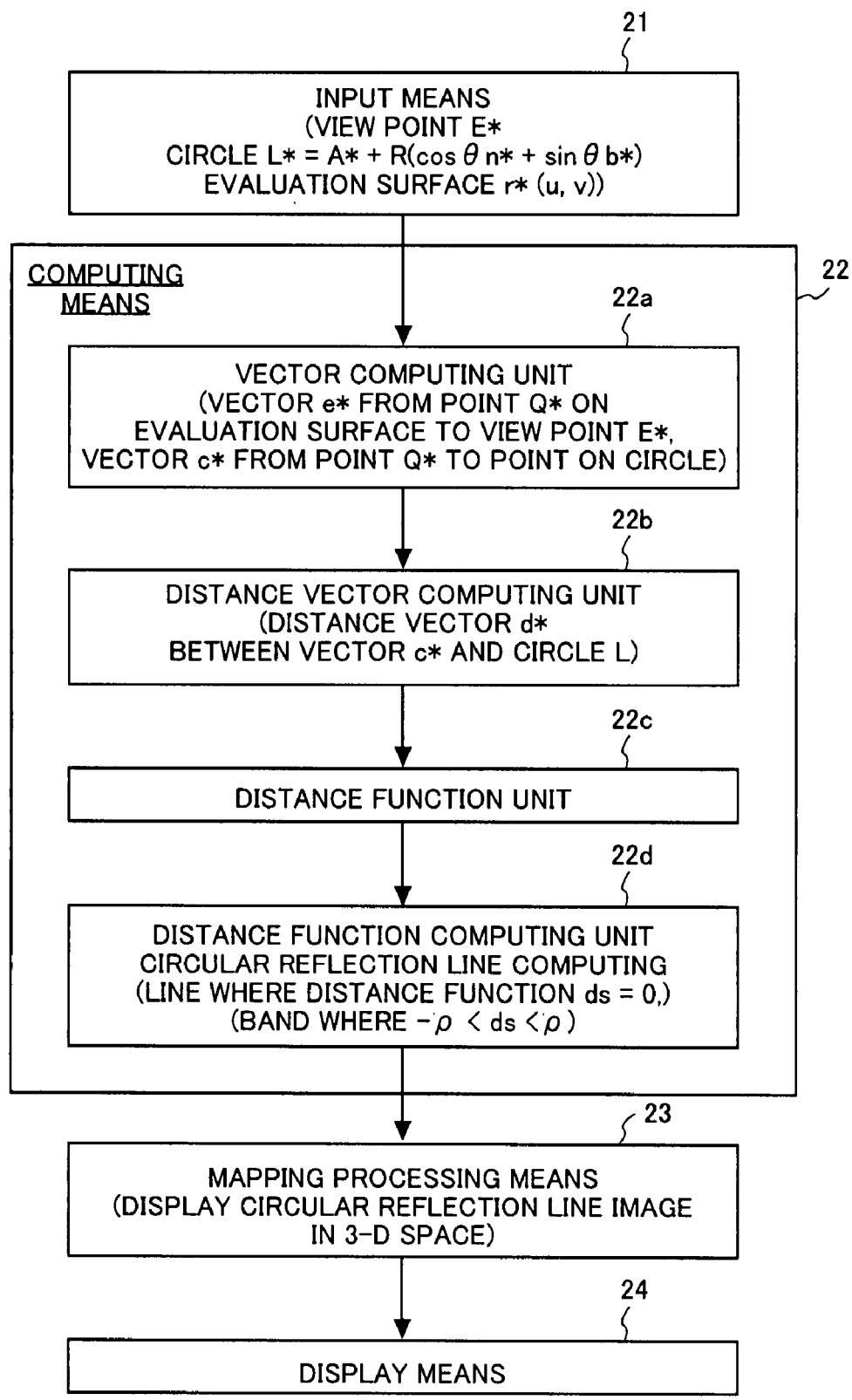
FIG. 11 is a diagram depicting a general configuration of the shape evaluation method and the shape evaluation device of the present invention.

FIG. 11 is a diagram depicting a general configuration of the shape evaluation method and shape evaluation device of the present invention.

The shape evaluation device of the present invention has computing means 22 for forming a characteristic line by extracting a point where the light from the annular light source reflects on the curved surface of the evaluation target from the points on the curved surface.

The computing means 22 comprises a vector computing unit 22a for determining a vector e* from a point Q* on the evaluation surfaced to the view point E*, and a vector c* which is symmetrical with the normal vector N* and is a in a direction from the point Q* to the circle L*, a distance vector computing unit 22b for determining a distance vector d* which represents the distance between the circle L* and the vector c*, a distance function unit 22c for determining a distance function from the distance vector d*, and a distance function computing unit 22d for determining a point on the curved surface r* where the value of the distance function is a predetermined value.

The shape evaluation device for determining a circular reflection line also has input means 21 for inputting computing conditions, such as the evaluation target curved surface r*(u, v) and circle L* corresponding to the annular light source, to the computing means 2, mapping processing means 23 for displaying an image of the circular reflection line, which is the characteristic line acquired by computing means 22 in the 3-D space, and display means 24, just like the configuration in FIG. 1.

The display means 24 superimposes and displays the circular reflection lines, which are characteristic lines, as a 3-D image, on the surface of the evaluation target shape. The user can observe and evaluate the status of the curved surface by the displayed 3-D image.

The CAD device or CAM device having this shape evaluation device as well can be implemented by connecting the shape evaluation device of a normal CAD device or CAM device and exchanging shape data, or by adding the above mentioned computing function, or adding a program for performing computing to the shape data processing means of the CAD device or CAM device.

Figure 12:
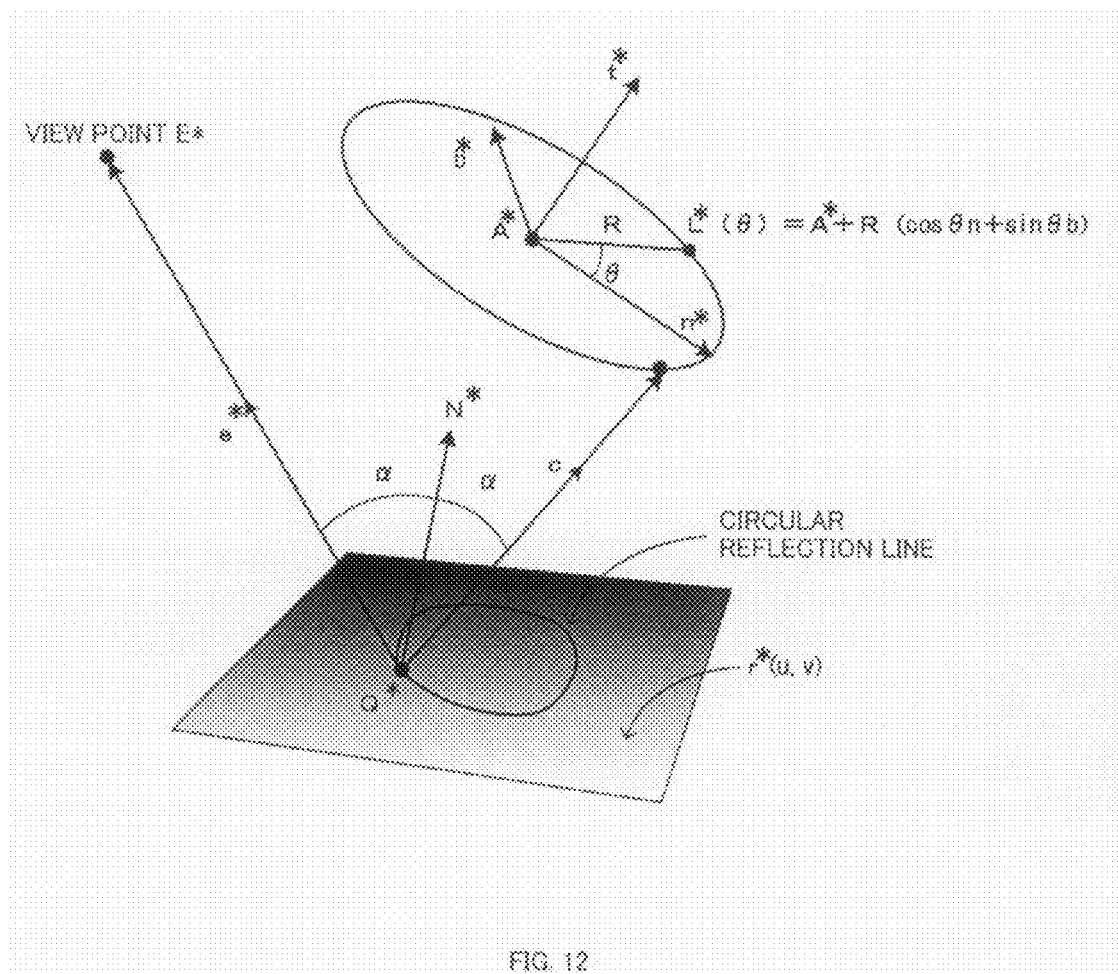
FIG. 12 is a diagram depicting the definition of a circular reflection line.
Figure 13:
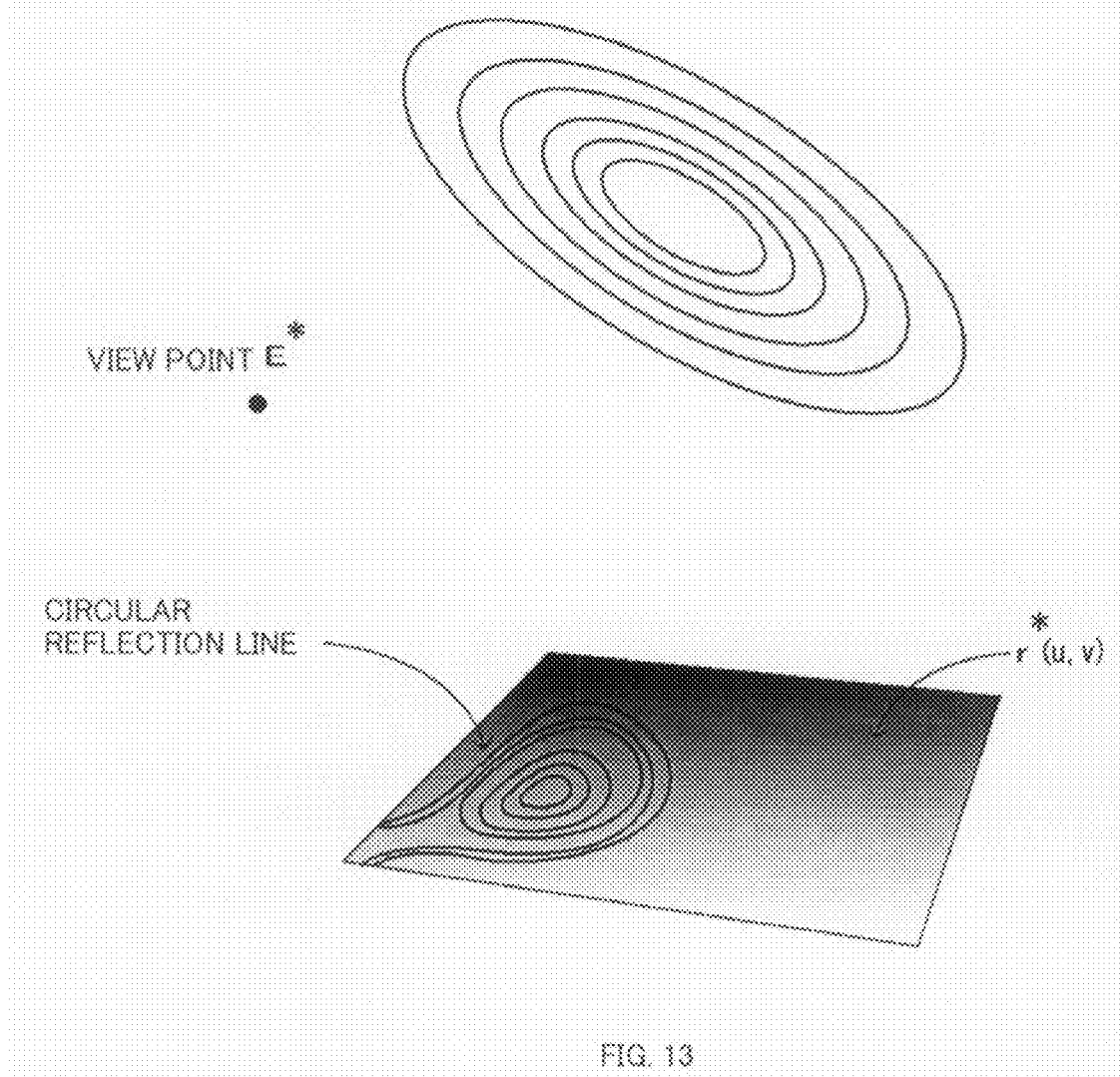
FIG. 13 is a diagram depicting the relationship between the view point E, curved surface, and annular light source (concentric annular light source)

FIG. 12 is a diagram depicting the definition of the circular reflection line. In FIG. 12, according to the relationship of the incident angle and reflection angle, the relationship of the view point vector e*, the normal vector N* of the curved surface and the reflection vector c* can be given by the following Expressions (26) to (28), where $\alpha$ is an angle between e* and N* or an angle between N* and c*.

$$c^* \cdot N^*(u,v) = \cos \alpha$$

$$c^* \cdot e^*(u,v) = \cos 2\alpha$$

$$|c^*| = 1 \tag{26}$$

Here the reflection vector c* is a unit vector expressed by $(L^*(\theta) - Q(u,v))/|L^*(\theta) - Q(u,v)|$ and the view point vector e* is a unit vector expressed by $(E^*(\theta) - Q(u,v)/|E^*(\theta) - Q(u,v)|$.

$\cos \alpha$ can be determined from the relationship of the view point vector and the normal vector of the curved surface.

The circular reflection line is calculated by determining the reflection vector c* by the above expression, and substituting the normal vector N* of the circular highlight line with the reflection vector c*.

In other words, the circular highlight line is formed by a set of points where the distance between the normal vector on the curved surface and the annular light source is "0", while the circular reflection line is formed by a set of points where the distance between the reflection vector and the annular light source is "0" on the curved surface. FIG. 13 shows a relationship between the view point E, curved surface and annular light source (concentric annular light source).

The computing time of the circular reflection line is similar to the computing time of the circular highlight line, where the only difference is the time required for computing the reflection vector.

FIG. 14 and FIG. 15 show examples of the circular highlight line. FIG. 14A is a display example of a shape with mainly elliptic points based on the circular highlight line of the present invention, and FIG. 14B is a display example of a shape with mainly elliptic points based on a conventional highlight line. As the comparison in FIG. 14 shows, the status of the curved surface shape can be observed in more detail if the circular highlight line of the present invention is used.

FIG. 15A is a display example of the hood of a car based on the circular highlight line of the present invention, and FIG. 15B is a display example thereof based on a conventional highlight line.

In this example, a $C^2$ discontinuous surface exists on the iso-parametric line of cubic B-Spline where u=0.25, u=0.75, v=0.25 and v=0.75, and this $C^2$ discontinuity can be observed in both the u and v directions if the circular highlight line is used. In the case of the highlight line in FIG. 15B, on the other hand, a $C^2$ discontinuity can be observed only for the v direction. If the curved surface is $C^1$ continuous, then the circular highlight line will be $C^0$ continuous.

The analytical solution of the quartic equation can be determined as follows (Non-patent Document 11).

The above Expression (15) is given by the following Expression (27).

$$x^4 + px^2 + qx + r = 0 \tag{27}$$

Here $$x = \tau + c_3/4c_4 \tag{28}$$

$$p = (-3c_3^2 + 8c_4 c_2)/8c_4^2 \tag{29}$$

$$q = (c_3^3 - 4c_4 c_3 c_2 + 8c_4^2 c_1)/8c_4^3 \tag{30}$$

$$r = (-3c_3^4 + 16c_4 c_3^2 c_2 - 64c_4^2 c_3 c_1 + 256c_4^3 c_0)/256c_4^4 \tag{31}$$

Here $$(x^2 + y)^2 = x^4 + 2x^2 y + y^2 \tag{32}$$

for an arbitrary y, and if $x^4$ is removed using Expression (27), then $$(x^2 + y)^2 = -px^2 - qx - r + 2x^2 y + y^2 \tag{33}$$
$$= (2y - p)x^2 - qx + (y^2 - r)$$

If the discriminant of x is zero, the right hand side of Expression (33) is $$q^2 - 4(2y - p)(y^2 - r) = 0 \tag{34}$$

$$8y^3 - 4py^2 - 8ry + 4pr - q^2 = 0 \tag{35}$$

Here Expression (33) where $y_1$ is a real root is $$(x^2 + y_1)^2 = K^2 x^2 - 2KLx + L^2 \tag{36}$$

Here $$K^2 = 2y_1 - p, \; L^2 = y_1^2 - r, \; 2KL = q \tag{37}$$

Therefore the following two expressions are acquired, $$x^2 - Kx + y_1 + L = 0, x^2 + Kx + y_1 - L = 0 \tag{38}$$

and this root is given by $$x = (K \pm \sqrt{(K^2 - 4(y_1 + L))})/2$$

$$x = (-K \pm \sqrt{(K^2 - 4(y_1 - L))})/2 \tag{39}$$

An example of performing shape evaluation using a static shape where the characteristic line does not change with time was described above, but the present invention can also perform shape evaluation using a dynamic shape where the characteristic line changes with time.

Now an example of performing shape evaluation using a dynamic shape by changing the characteristic line with time will be described with reference to FIG. 16 to FIG. 26.

Figure 22:
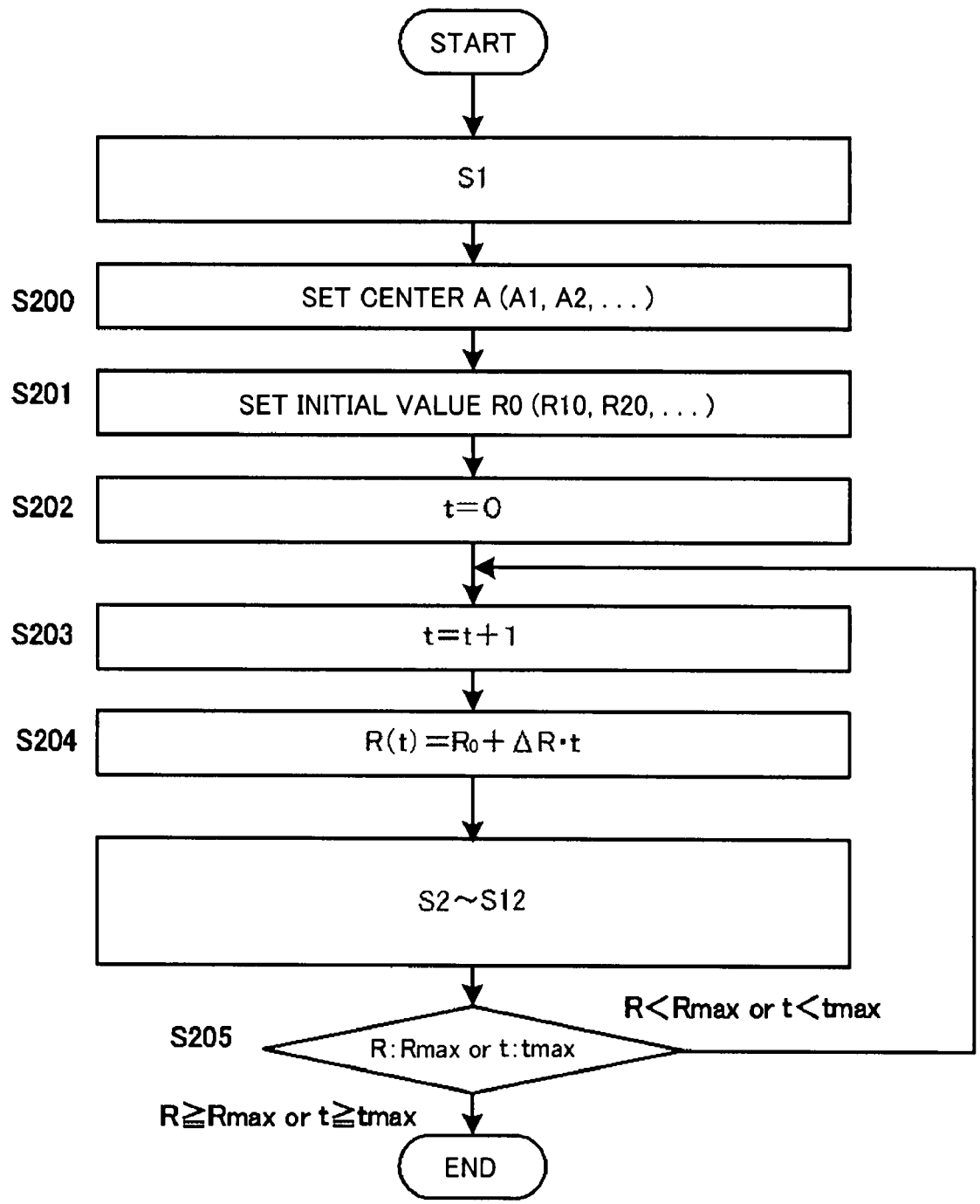
FIG. 22 is a flow chart depicting the case when there are a plurality of annular light sources.
Figures 25A, 25B, 25C:
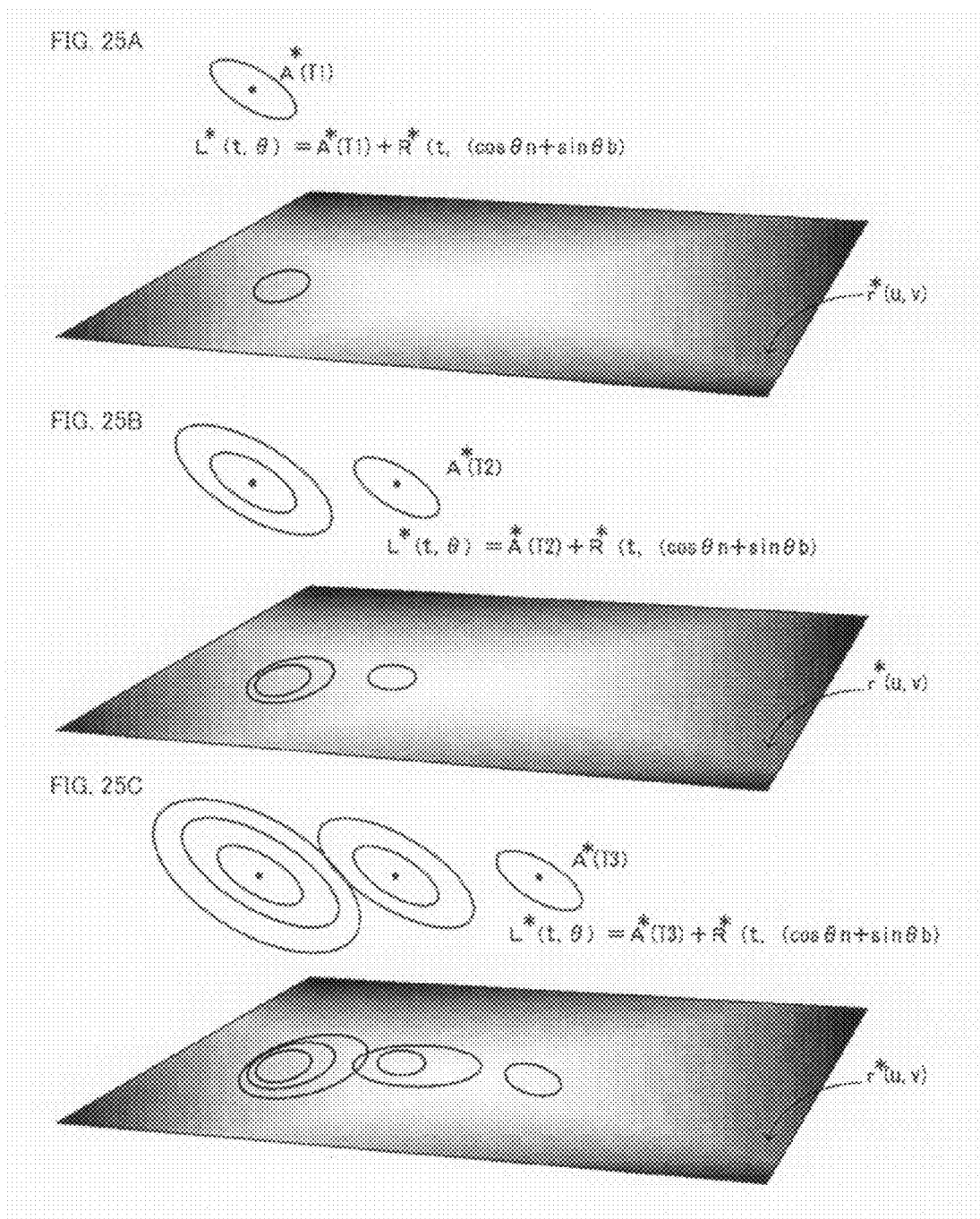
FIG. 25 are diagrams depicting the case when the center of the annular light source moves.
Figure 26:
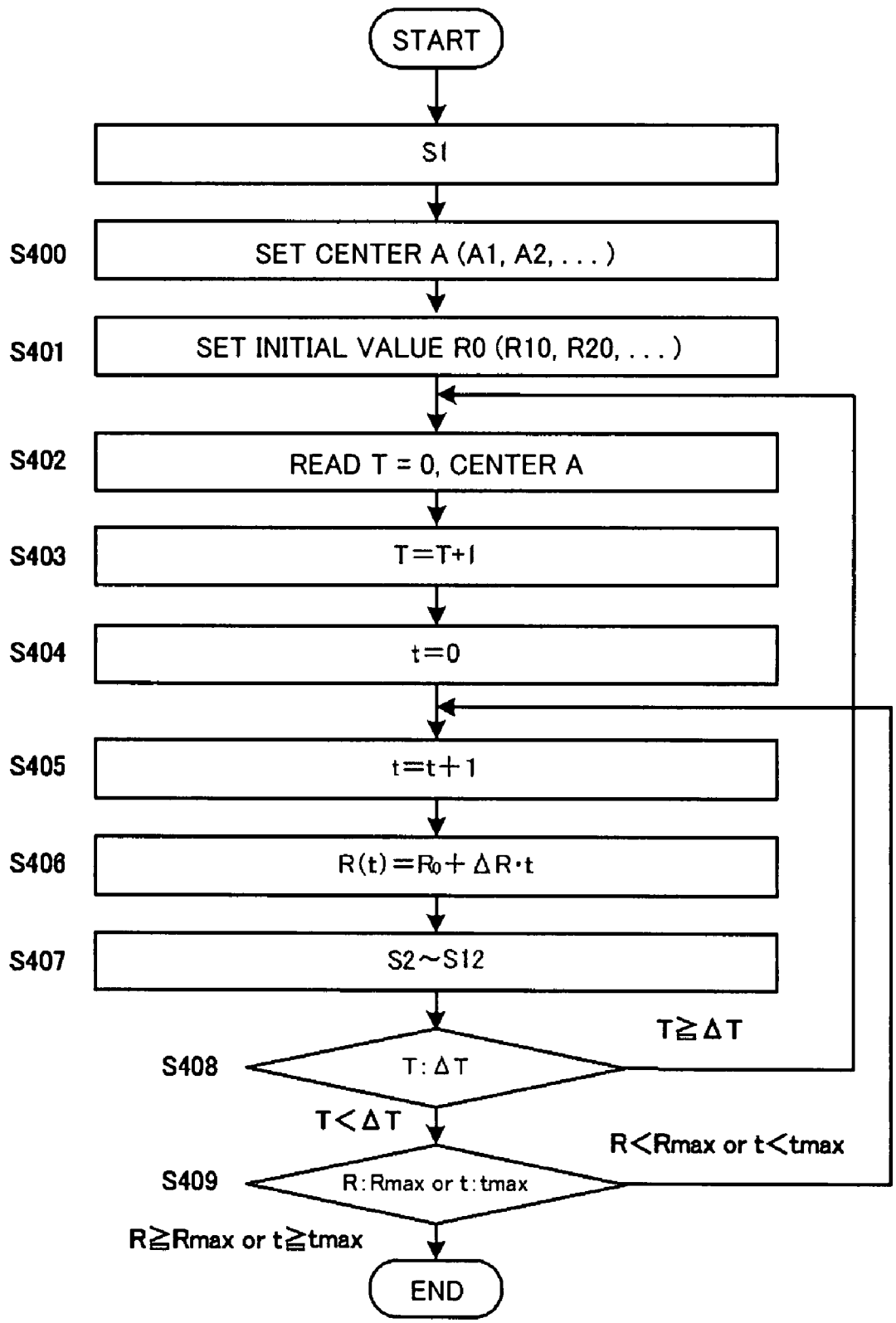
FIG. 26 is a flow chart depicting the case when the center of the annular light source moves.
Figure 28A:
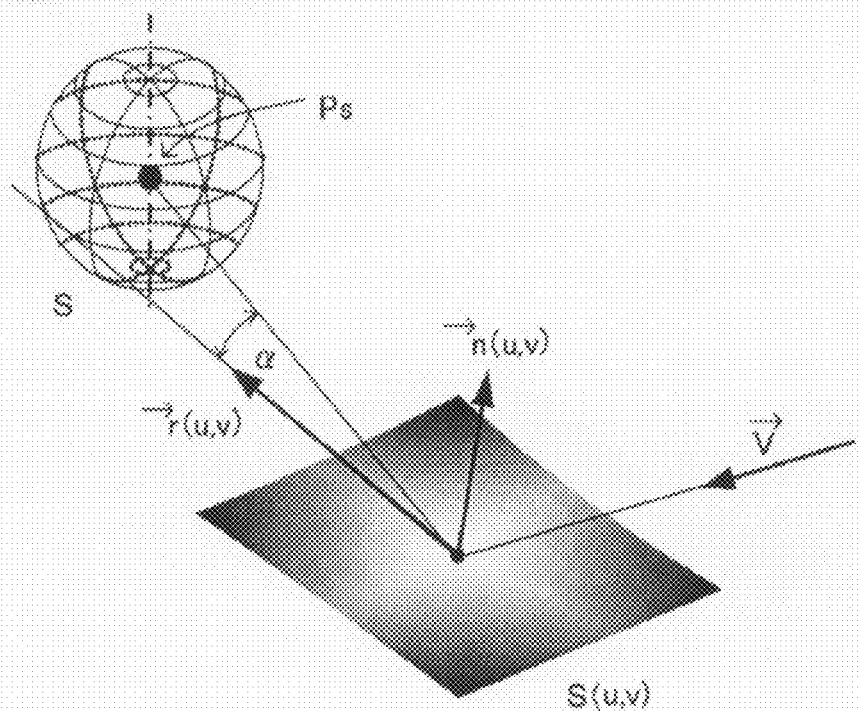
FIG. 28 are diagrams depicting the shape evaluation based on an oval curve.
Figure 28B:
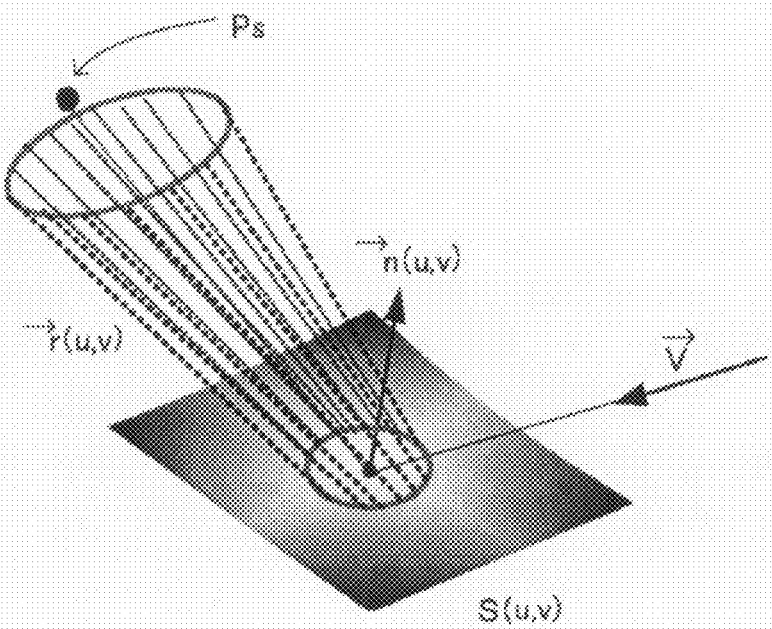

In the following description, FIG. 16 to FIG. 19 are used to describe a case where there is one annular light source as shape evaluation using a dynamic shape, FIG. 20 to FIG. 22 are used to describe a case when there are a plurality (two in this case) of annular light sources, FIG. 23 and FIG. 24 are used to described the case of extracting a characteristic portion of the surface shape from the characteristic lines, and FIG. 25 and FIG. 26 are used to describe the case when the center of the annular light source moves.

Figure 16A:
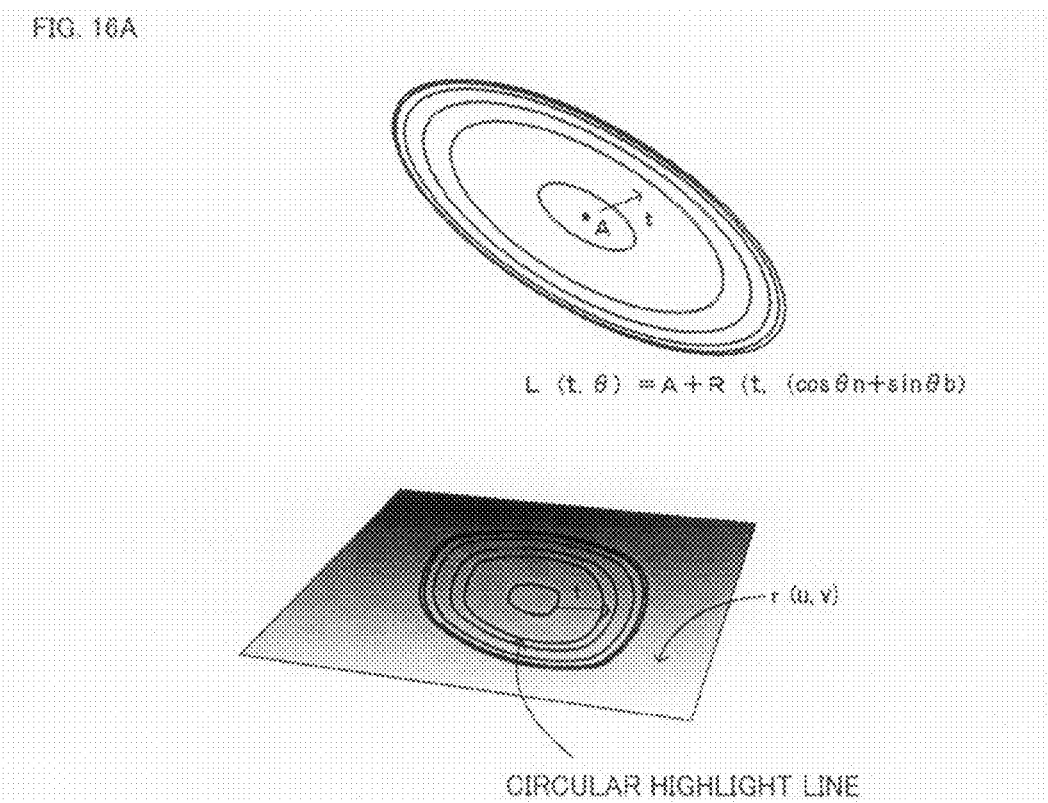
FIG. 16 are diagrams depicting the shape evaluation using dynamic shape when there is one annular light source.
Figure 16B:
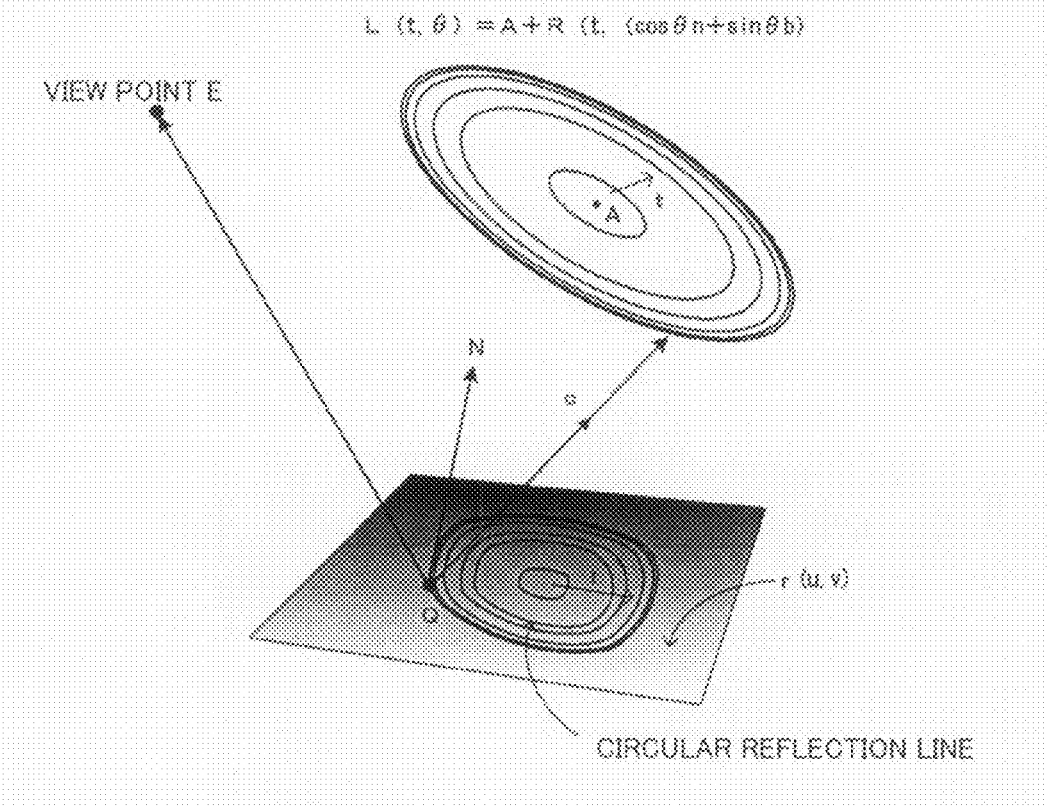

First the shape evaluation using a dynamic shape where there is one annular light source will be described. FIG. 16A shows a circular highlight line which is formed on the evaluation surface by the annular light source of which radius of the circle changes along with time, and FIG. 16B shows a circular reflection line formed on the evaluation surface by the annular light source of which radius of the circle changes along with time. In the following description, mainly the circular highlight line in FIG. 16A will be described.

As described above, the circle L of the annular light source is represented by the center A and the diameter R. The dynamic shape can be formed by changing the value of the diameter R along with time t. The circular highlight line shown in FIG. 16A shows an example when the diameter R of the annular light source increases along with time t. The diameter R may be decreased along with time t. Here is an example when a plurality of circular highlight lines are generated along with time, and each circular highlight line changes along with time t.

By this, the evaluation operator can observe the status of the circular highlight line changing dynamically, and evaluation of the evaluation surface becomes easier. Also by dynamically changing a plurality of circular highlight lines, the evaluation of the evaluation surface becomes easier.

In the case of the circular reflection line shown in FIG. 16B as well, a dynamic shape can be formed by changing the value of the diameter R of the annular light source along with time t, just like the case of the circular highlight line.

Figure 17:
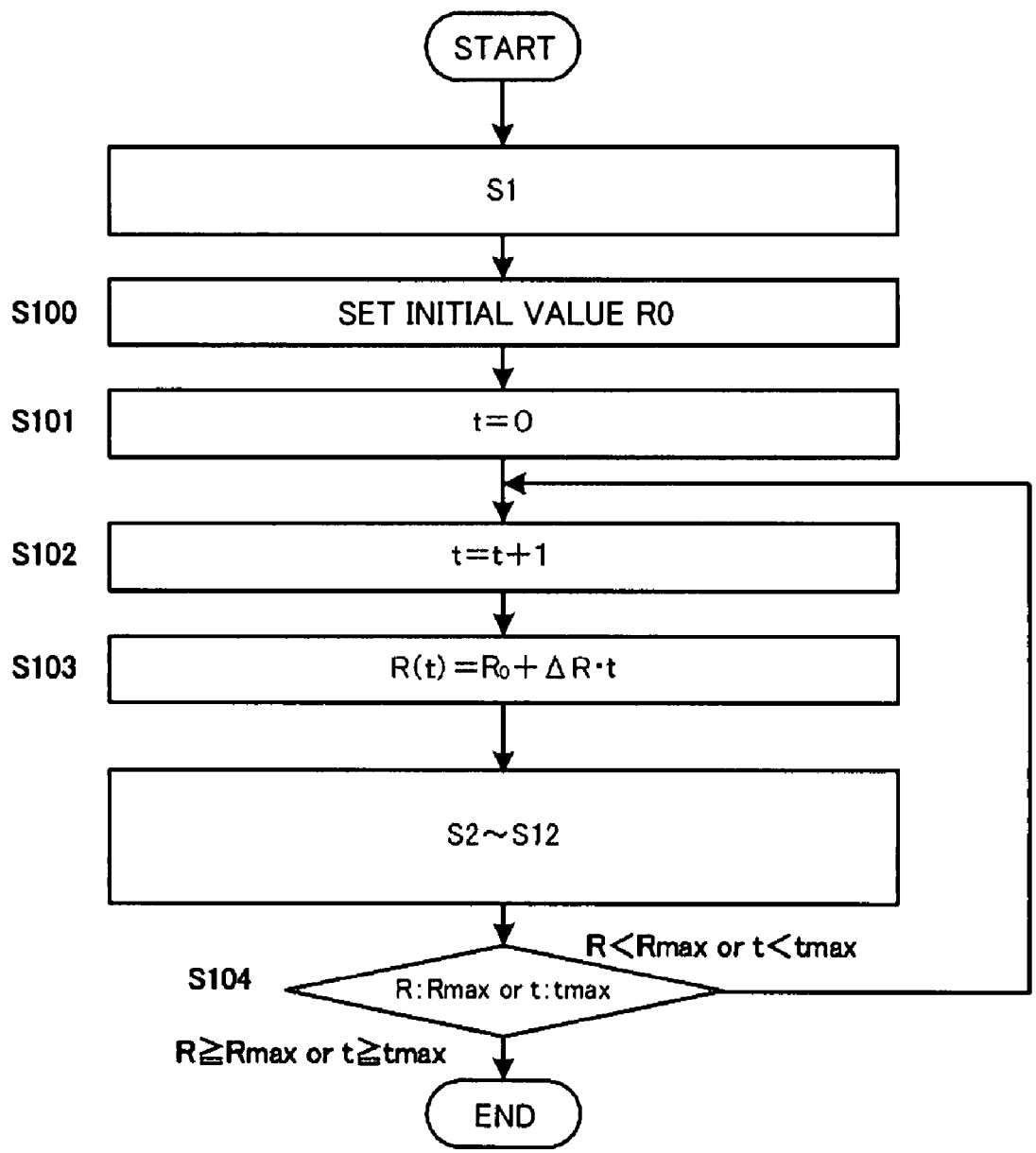
FIG. 17 is a flow chart depicting the operation of shape evaluation using dynamic shape when there is one annular light source.

FIG. 17 is a flow chart depicting the shape evaluation operation using a dynamic shape when there is one annular light source. In the flow chart in FIG. 17, S1 and S2 to S12 are the same as the steps described in FIG. 3, therefore only the shape evaluation steps using a dynamic shape will be described here, and description of S1 to S12 will be omitted.

After selecting a point Q on the evaluation surface in the real space in step S1, an initial value R0 of the diameter R of the circle L of the annular light source is set. The diameter R of the circle L increases or decreases from this initial value R0 along with time t. The increase/decrease of the diameter R can be repeated according to necessity, and after the diameter R increases or decreases in one direction and reaches a predetermined length or after a predetermined time elapses, the diameter R returns to the initial value and repeats the increase or decrease, but both the increase or decrease may be repeated. Instead of uniformly increasing or decreasing, the diameter R may increase or decrease according to a predetermined pattern (S100).

After determining the initial value R0 in step S100, the time is set to t=0 (S101), which becomes t=t+1 at the start (S102), then the diameter R is sequentially changed. In this case, R(t)=R0+ΔR·t, and the diameter R is changed in ΔR units. The change of R in ΔR units is an example, and an arbitrary change may be set using predetermined functions and tables (S103).

After decreasing the length of the diameter R in S103, a characteristic line of a circular highlight line or circular reflection line is formed by the above steps S2 to S12 and displayed.

This characteristic line processing (S102, S103, S2 to S12) is performed until the diameter R becomes a predetermined length (Rmax in this case), or until a predetermined time elapses (tmax in this case) (S104). Also as described above, the operation shown in FIG. 17 may be repeated for a plurality of times.

The flow chart in FIG. 17 shows the operation when one characteristic line is formed by the annular light source, but if a plurality of characteristic lines are formed, the operation according to the flow chart in FIG. 17 is performed in parallel, with shifting the start of forming each characteristic line in S101. By this, a plurality of characteristic lines can be generated.

Figure 19A:
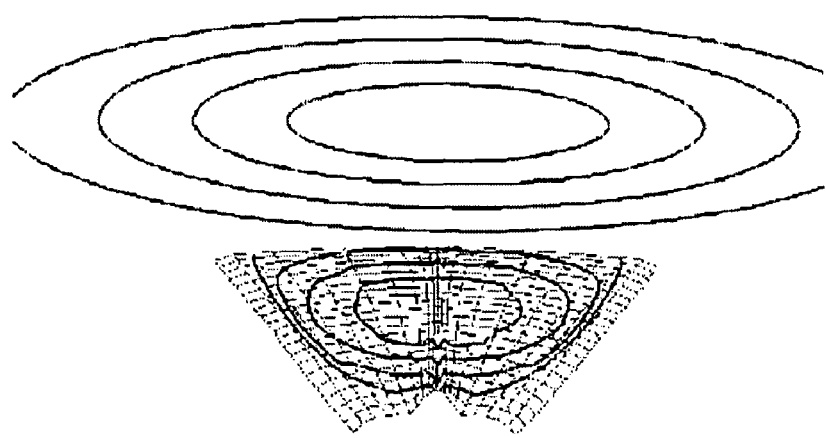
FIG. 19 are diagrams depicting examples of a characteristic line formed by one annular light source.
Figure 19B:
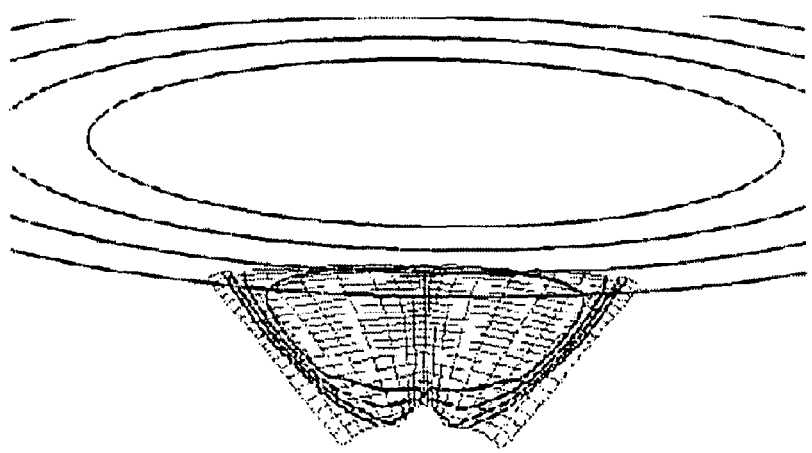
Figure 19C:
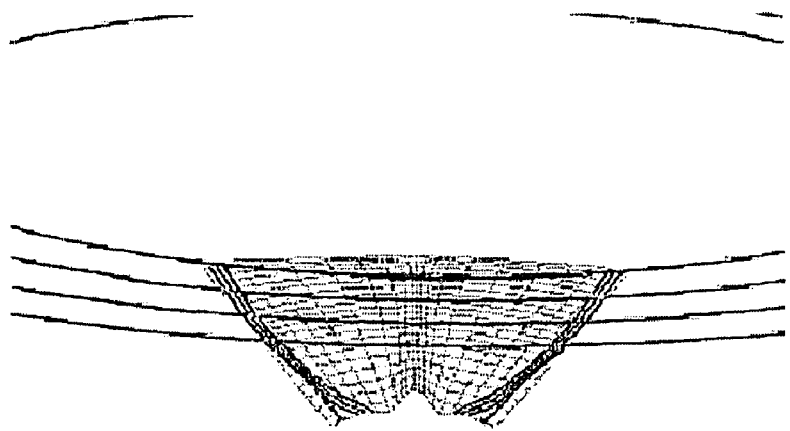

FIG. 18 and FIG. 19 are examples of the characteristic lines formed by one annular light source, and shows the characteristic lines at t=t1 to t=t6. The plurality of characteristic lines in FIG. 18 and FIG. 19 are selected based on the simulation result as time elapses, but these are merely extracted to described the status of the dynamic shape, and the time interval of t1 to t6 is not always constant. FIG. 18A to FIG. 18C show the characteristic lines at t=t1 to t=t3, and FIG. 19A to FIG. 19C show the characteristic lines at t=t4 to t=t6. In FIG. 18 and FIG. 19, the circle L of the annular light source is shown above, and the characteristic lines displayed on the evaluation surface are shown below.

Figure 20A:
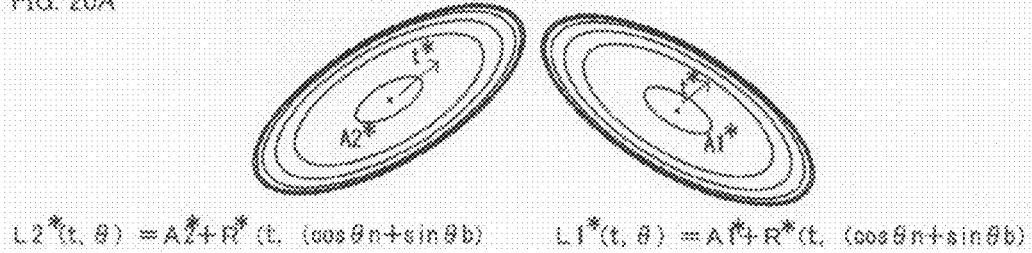
FIG. 20 are diagrams depicting the case when there are a plurality of annular light sources.
Figure 20B:
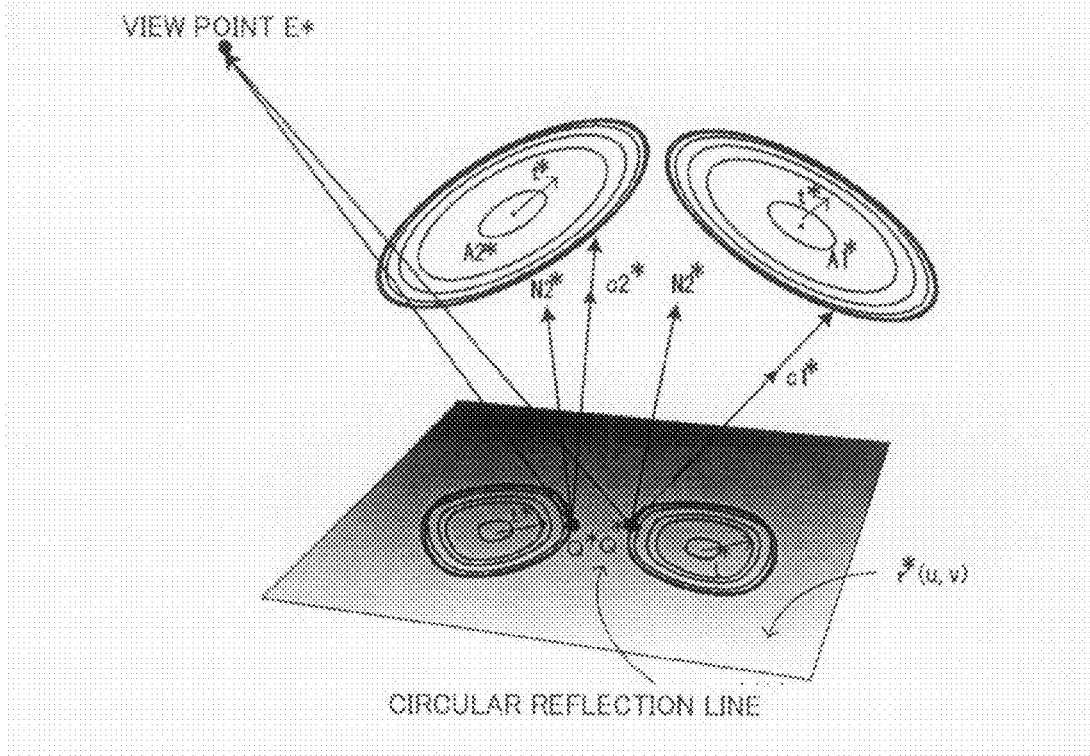

Now the case when there are a plurality of annular light sources will be described with reference to FIG. 20 to FIG. 22. In this example, two annular light sources are used as the plurality of annular light sources. FIG. 20A shows an example when the radiuses of circles L1 and L2 of the two annular light sources A1 and A2 change along with time, and two circular highlight lines are formed on the evaluation surface by this, and FIG. 20B shows an example when the radiuses of the circles of the two annular light sources change along with time, and two circular reflection lines are formed on the evaluation surface by this. Mainly the circular highlight lines in FIG. 20A will be described herein below.

As described in FIG. 16, the circles L1 and L2 of the annular light sources A1 and A2 are represented by the centers A1 and A2 and diameters R1 and R2. The dynamic shapes are formed by changing the lengths of the diameters R1 and R2 along with time t. The circular highlight lines in FIG. 20A show an example when the diameters R1 and R2 of the annular light sources A1 and A2 increase along with time t.

As described above, the diameters R1 and R2 may be decreased along with time t. FIG. 20A is also an example when a plurality of circular highlight lines are generated along with time, and each circular highlight line changes respectively along with time t.

By this, the evaluation operator can observe the status when the circular highlight lines formed by the plurality of annular light sources dynamically change, and evaluation of a wide range of the evaluation surface becomes easier.

In the case of the circular reflection line shown in FIG. 20B as well, the dynamic shapes can be formed by changing the lengths of the diameters R of the annular light sources along with time t, just like the case of the circular highlight line.

FIG. 21 shows a display example of characteristic lines using a plurality of annular light sources. FIG. 21A to FIG. 21E show an example when one characteristic line is respectively formed by the two annular light sources, and each characteristic line changes along with time. FIG. 21F to FIG. 21G show an example when two characteristic lines are respectively formed by the two annular light sources, and each characteristic line changes along with time.

FIG. 22 is a flow chart depicting an operation of shape evaluation using dynamic shapes when there are a plurality of annular light sources. In the flow chart in FIG. 22, S1 and S2 to S12 are the same as the steps described in FIG. 3, therefore only the shape evaluation steps using dynamic shape will be described here, and description on S1 to S12 will be omitted.

After selecting a point Q on the evaluation surface in the real space in step S1, the centers A(A1, A2, . . . ) of the circles L of a plurality of annular light sources are set (S200), and the initial values R0 (R10, R20, . . . ) of the diameters R of the circles L of the annular light sources are set. The diameter R of the circle L increases or decreases from the initial value R0 along with time t. The increase/decrease of the diameter R can be repeated according to necessity, and after the diameter R increases or decreases in one direction, and reaches a predetermined length, or after a predetermined time elapses, the diameter R returns to the initial value and repeats the increase or decrease, but both the increase and decrease may be repeated. Instead of uniformly increasing or decreasing, the diameter R may increase or decrease according to a predetermined pattern (S201).

After determining the initial value R0 in step S201, the time is set to t=0 (S202), which becomes t=t+1 at the start (S203), then the diameter R is sequentially changed. In this case, R(t)=R0+ΔR·t, and the diameter R is changed in ΔR units. The change of R in ΔR units is an example, and an arbitrary change may be set using predetermined functions and tables (S204).

After determining the lengths of the diameter R in S204, a characteristic line of the circular highlight line or circular reflection line is formed by the above steps S2 to S12 and displayed.

This characteristic line processing (S203, S204, S2 to S12) is performed until the diameter R becomes a predetermined length (Rmax in this case), or until a predetermined times elapses (tmax in this case) (S205). Also as described above, the operation shown in FIG. 22 may be repeated for a plurality of times.

The flow chart in FIG. 22 shows the operation when one characteristic line is formed by the annular light source, but if a plurality of characteristic lines are formed, the operation according to the flow chart in FIG. 22 is performed in parallel, with shifting the start of forming each characteristic line in S203. By this, a plurality of characteristic lines can be generated.

Now an example of extracting a characteristic portion of the surface shape from the characteristic line will be described with reference to FIG. 23 and FIG. 24. The surface shape may include a characteristic portion of which radius of curvature is small and regarded as a discontinuous portion. Such a characteristic portion can be observed by displaying a static shape or a dynamic shape of characteristic lines, but this characteristic portion can be displayed even more clearly if extracted.

Figure 23A:
FIG. 23 are diagrams depicting examples for extracting a characteristic portion of the surface shape from the characteristic line.
Figure 23B:
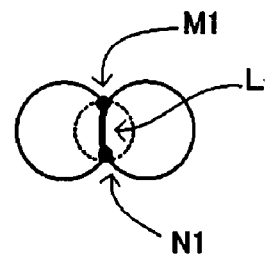
Figure 23C:
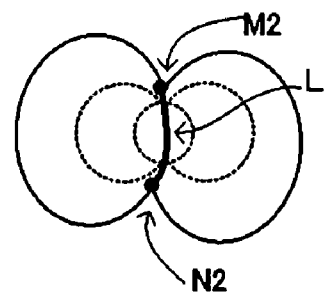
Figure 23D:
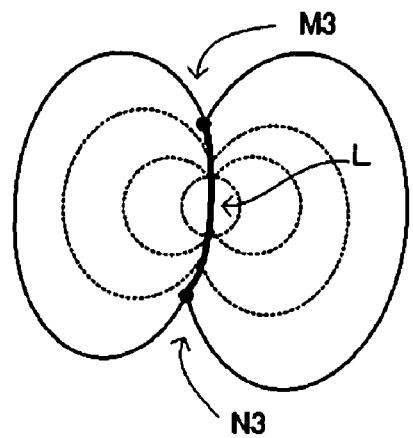

Here discontinuous points at each time are detected during a period when the characteristic line changes dynamically, and a characteristic portion is extracted by connecting these discontinuous points, and a connected line is formed. FIG. 23A to FIG. 23D show the forming of the connection line according to the time-based change. In FIG. 23B, the discontinuous points M1 and N1 are extracted from the characteristic lines at time t=t2, and a connection line K1, which connects these discontinuous points M1 and N1, is formed. In FIG. 23C, the discontinuous points M2 and N2 are extracted from the characteristic lines at time t=t3, and a connection line K2, which connects these discontinuous points M1, N1, M2 and N2, is formed. In FIG. 23D, the discontinuous points M3 and N3 are extracted from the characteristic lines at time t=t4, and the connection line K3, which connects the discontinuous points M1, N1, M2, N2, M3 and N3, is formed.

The points between each discontinuous point are determined by interpolation, and points outside the discontinuous points are determined by extrapolation.

FIG. 24 is a flow chart depicting the operation for extracting a characteristic portion of the surface shape from the characteristic lines. In the flow chart in FIG. 24, S1 and S2 to S12 are the same as the steps described in FIG. 3, therefore only the shape evaluation steps using a dynamic shape will be described, and description on S1 to S12 will be omitted.

After selecting a point Q on the evaluation surface in the real space in step S1, the centers A (A1, A2, . . . ) of the circles L of a plurality of annular light sources are set (S300), and the initial values R0 (R10, R20, . . . ) of the diameters R of the circles L of the annular light sources are set. The diameter R of the circle L increases or decreases from the initial value R0 along with time t. The increase/decrease of the diameter R can be repeated according to necessity, and after the diameter R increases or decreases in one direction, and reaches a predetermined length, or after a predetermined time elapses, the diameter R returns to the initial value and repeats the increase or decrease, but both the increase and decrease may be repeated. Instead of uniformly increasing or decreasing, the diameter R may increase or decrease according to a predetermined pattern (S301).

After determining the initial value R0 in step S301, the time is set to t=0 (S302), which becomes t=t+1 at the start (S303), then the diameter R is sequentially changed. In this case, R(t)=R0+ΔR·t, and the diameter R is changed in ΔR units. The change of R in ΔR units is an example, and an arbitrary change may be set using predetermined functions and tables (S304).

After determining the length of the diameter R in S304, a characteristic line of a circular highlight line or circular reflection line is formed by the above steps S2 to S12 and displayed.

Discontinuous points are determined for the determined characteristic line. The discontinuous points can be determined by determining the positions of bending or deviation of the characteristic line (S305). The determined discontinuous points are stored in the storage means (S306), and a connection line connecting these discontinuous points is formed (S307). The formed connection line is displayed (S308).

This characteristic line processing (S203, S204, S2 to S12) is performed until the diameter R becomes a predetermined length (Rmax in this case), or until a predetermined time elapses (tmax in this case) (S205). Also as described above, the operation shown in FIG. 24 may be repeated for a plurality of times.

The flow chart in FIG. 24 shows the operation when one characteristic line is formed by the annular light source, but if a plurality of characteristic lines are formed, the operation according to the flow chart in FIG. 24 is performed in parallel with shifting the start of forming each characteristic line in S303. By this, a plurality of characteristic lines can be generated.

Now the case of the center of the annular light source moving will be described with reference to FIG. 25 and FIG. 26. In the above examples, the center of the annular light source is fixed, but the center of the annular light source may be moved. The moving track of the center of the annular light source may be an arbitrary curve, instead of a straight line.

For the formation of the characteristic line by moving the annular light source, the same annular light source may move along with time, or the generation positions of a plurality of annular light sources may move along with time.

The case of moving the generation positions of a plurality of annular light sources along with time will be described below. FIG. 25 shows a status when the center of the annular light source moves along with time. FIG. 25A shows a status when the formation of the characteristic line by the annular light source A1 is started a t=t1. The center position itself of the annular light source A1 is at the same position, regardless the change along with time, and the characteristic line formed by this annular light source A1 changes along with time.

FIG. 25B shows a status when the formation of the characteristic line by the annular light source A2 is started at t=t2. In addition to the characteristic line formed by the annular light source A2, the characteristic line of the annular light source A1, which started to be formed at t=t1, is also displayed. At this time, the characteristic line formed by the annular light source A1 has been changed for the amount of the elapsed time.

FIG. 25C shows a status when the formation of the characteristic line by the annular light source A3 is started at t=t3. In addition to the characteristic line formed by the annular light source A3, the characteristic line of the annular light source A1, which started to be formed at t=t1, and the characteristic line of the annular light source A2 which started to be formed at t=t2, are also displayed at the same time. At this time, each characteristic line formed by the annular light sources A1 and A2 has been changed by the amount of the elapsed time respectively. According to this mode, a wide range of an evaluation surface can be evaluated.

FIG. 26 is a flow chart depicting the operation when the center of the annular light source is moved. In the flow chart in FIG. 26, S1 and S2 to S12 are the same as the steps described in FIG. 3, therefore only the shape evaluation steps using a dynamic shape will be described, and description on S1 to S12 will be omitted.

After selecting a point Q on the evaluation surface in the real space in step S1, the centers A (A1, A2, . . . ) of the circles L of a plurality of annular light sources are set (S400), and the initial values R0 (R10, R20, . . . ) of the diameters R of the circles L of the annular light sources are set. The diameter R of the circle L increases or decreases from the initial value R0 along with time t. The increase/decrease of the diameter R can be repeated according to necessity, and after the diameter R increases or decreases in one direction, and reaches a predetermined length, or after a predetermined time elapses, the diameter R returns to the initial value and repeats the increase or decrease, but both the increase and decreased may be repeated. Instead of uniformly increasing or decreasing, the diameter R may increase or decrease according to a predetermined pattern (S401).

After determining the initial value R0 in step S401, time T=0, the first center A1 of the annular light source is read (S402), and operation of moving the center of the annular light source is started with T=T+1 (S403).

After setting the time to t=0 (S404), the change of the characteristic line is started at t=t+1 (S405), and the diameter R is sequentially changed. In this case, R(t)=R0+ΔR·t, and the diameter R is changed in ΔR units. The change of R in ΔR units is an example, and an arbitrary change may be set using predetermined functions and tables (S406).

After determining the length of the diameter R in S406, a characteristic line of a circular highlight line or circular reflection line is formed by the above steps S2 to S12, and displayed (S407).

When time T, which defines the movement of the center of the annular light source, elapses a predetermined time ΔT (S408), processing returns to S402, and the second center position A2 is read, and a characteristic line is formed by the next annular light source. In S408, while time T has not elapsed a predetermined time ΔT, the above mentioned characteristic line processing (S203, S204, S2 to S12) is performed until diameter R becomes a predetermined length (Rmax in this case), or until a predetermined time elapses (tmax in this case) (S409).

The flow chart in FIG. 26 shows operation when one characteristic line is formed by the annular light source, but if a plurality of characteristic lines are formed, the operation according to the flow chart in FIG. 26 is performed in parallel, with shifting the start of forming each characteristic line in S404. By this, a plurality of characteristic lines can be generated.

INDUSTRIAL APPLICABILITY

The present invention can be applied to arbitrary fields which use shape evaluation, such as shape setting and shape processing, and is particularly suitable for processing that requires real-time processing.

The invention claimed is

1. A shape evaluation method for evaluating a curved surface of a shape by a characteristic line, wherein said characteristic line is a circular highlight line or a circular reflection line which an annular light source in an arbitrary direction in a three-dimensional space forms on said curved surface, said annular light source having a radius and a center that are variable, said characteristic line is formed by extracting points, where the light from said annular light source irradiates or reflects on said curved surface, from points on said curved surface by computing, and said computing obtains a vectorial correspondence between each of the points on said curved surface and positions on said annular light source.

2. The shape evaluation method according to claim 1, wherein said computing determines a point where a vector of which distance to a circle in the three-dimensional space having the same diameter and the same position and direction as said annular light source is within a predetermined range passes through on the curved surface among vectors in a predetermined direction passing through the point on said curved surface.

3. The shape evaluation method according to claim 2, wherein said computing determines a distance vector that represents the distance between said circle and said vector, determines a distance function from said distance vector, and determines a point on said curved surface of which said distance function value is a predetermined value.

4. The shape evaluation method according to claim 2 or claim 3, wherein if said characteristic line is a circular highlight line, the predetermined direction of said vector is a normal line direction on a point on the curved surface where said vector passes through.

5. The shape evaluation method according to claim 2 or claim 3, wherein if said characteristic line is a circular reflection line, the predetermined direction of said vector is a direction symmetric with a vector direction from a point where said vector passes through on the curved surface to a view point with respect to a normal line through said point.

6. The shape evaluation method according to claim 2 or 3, wherein said characteristic line is a curve or a band, said curve is one line of a curve determined by points at which the distance between said vector and said circle is zero, and said band is formed and held by two lines of curves determined by points at which the distance between said vector and said circle is an upper limit value and a lower limit value in a predetermined range.

7. The shape evaluation method according to claim 2 or 3, wherein the center and/or the radius of said circle is/are changed with time.

8. The shape evaluation method according to claim 2 or 3, wherein a plurality of said circles are provided and a plurality of said characteristic lines are generated.

9. The shape evaluation method according to claim 2 or 3, wherein a plurality of said circles are provided and the center and/or the radius of said circles is/are changed with time, so that a connected line where discontinuous points of the characteristic line at each time are connected in a time sequence is formed.

10. The shape evaluation method according to claim 2 or 3, wherein said computing is an analytical solution of a quartic equation acquired from the differential equation of said distance function.

11. A shape evaluation device for evaluating a curved surface of a shape by a characteristic line, wherein
said characteristic line is a circular highlight line or a circular reflection line which an annular light source in an arbitrary direction in a three-dimensional space forms on the curved surface, said annular light source having a radius and a center that are variable,
computing means for forming the characteristic line by extracting a point, where the light from said annular light source irradiates or reflects on the curved surface, from the points on the curved surface, and said computing means is obtaining a vectorial correspondence between each of the points on said curved surface and points on said annular light source.

12. The shape evaluation device according to claim 11, wherein
said computing means determines a point where a vector of which distance to a circle in a three-dimensional space having the same diameter and the same position and direction as said annular light source is within a predetermined range passes through on the curved surface among vectors in a predetermined direction passing through a point on the curved surface.

13. The shape evaluation device according to claim 12, wherein
said computing means comprises:
a distance vector computing unit for determining a distance vector that represents the distance between said circle and said vector;
a distance function unit for determining a distance function from said distance vector; and
a distance function computing unit for determining a point on said curved surface of which said distance function value is a predetermined value.

14. The shape evaluation device according to claim 12 or claim 13, wherein the distance vector computing unit of said computing means determines a point for forming a circular highlight line using the predetermined direction of said vector as a normal line direction on the point on the curved surface where said vector passes through.

15. The shape evaluation device according to claim 12 or claim 13, wherein the distance vector computing unit of said computing means determines a point for forming a circular reflection line, regarding the predetermined direction of said vector as a direction symmetric with a vector direction from a point where said vector passes through on the curved surface to a view point with respect to a normal line through said point.

16. The shape evaluation device according to claim 12 or 13, wherein the distance function computing unit of said computing means forms one line of a curve by determining points at which the distance between said vector and said circle is zero, or forms two lines of curves by determining points at which the distance between said vector and said circle is an upper limit value and a lower limit value in a predetermined range, and forms a band held by said curves.

17. The shape evaluation device according to claim 12 or 13, wherein said computing means forms a characteristic line which changes with time by changing the center and/or the radius of said circle with time.

18. The shape evaluation device according to claim 12 or 13, wherein said computing means has a plurality of said circles and forms a plurality of characteristic lines.

19. The shape evaluation device according to claim 12 or 13, wherein said computing means has a plurality of said circles, changes the center and/or the radius of said circles with times, and forms a connected line where discontinuous points of the characteristic line at each time are connected in a time sequence.

20. The shape evaluation device according to claim 12 or 13, wherein the distance function computing unit of said computing means computes an analytical solution of a quartic equation acquired from the differential equation of said distance function.

21. A program medium recording a program causing a computer to execute computing to form a characteristic line on a shape surface, wherein
said characteristic line is a circular highlight line or a circular reflection line which an annular light source in an arbitrary direction in a three-dimensional space forms on said curved surface, said annular light source having a radius and a center that are variable,
said computing is extracting a point, at which the light from said annular light source irradiates or reflects on said curved surface, from points on said curved surface, and
said computing is obtaining a vectorial correspondence between each of the points on said curved surface and points on said annular light source.

22. The program medium according to claim 21, wherein said computing determines a point where a vector of which distance to a circle in the three-dimensional space having the same diameter and the same position and direction as said annular light source is within a predetermined range passes through on the curved surface among vectors in a predetermined direction passing through a point on the curved surface.

23. The program medium according to claim 22, wherein said computing comprises:
determining a distance vector that represents the distance between said circle and said vector;
determining a distance function from said distance vector; and
determining a point on said curve surface of which said distance function value is a predetermined value.

24. A CAD device for supporting shape design by a computer, comprising the shape evaluation device according to any one of claims 11, 12, and 13 that evaluates a curved surface of said shape by a characteristic line, wherein said shape evaluation device displays a circular highlight line or a circular reflection line, which an annular light source in an arbitrary direction in the three-dimensional space formed on the curved surface as the characteristic line on a display, said annular light source having a radius and a center that are variable.

25. A CAM device for supporting generation of execution data to be used for producing a setting target based on the shape data of the target by a computer, comprising the shape evaluation device according to any one of claims 11, 12, and 13 which evaluates a curved surface based on said shape data and/or execution data by a characteristic line, wherein said shape evaluation device displays a circular highlight line or a circular reflection line, which an annular light source in an arbitrary direction in the three-dimensional space forms on said curved surface as the characteristic line on a display, said annular light source having a radius and a center that are variable.

* * * * *